United States Patent
Sharifi et al.

(10) Patent No.: US 12,444,417 B2
(45) Date of Patent: Oct. 14, 2025

(54) TRANSFERRING ACTIONS FROM A SHARED DEVICE TO A PERSONAL DEVICE ASSOCIATED WITH AN ACCOUNT OF A USER

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 198 days.

(21) Appl. No.: 18/121,394

(22) Filed: Mar. 14, 2023

(65) Prior Publication Data

US 2024/0312455 A1   Sep. 19, 2024

(51) Int. Cl.
*G06F 3/16* (2006.01)
*G10L 15/22* (2006.01)
*H04L 9/40* (2022.01)

(52) U.S. Cl.
CPC .............. *G10L 15/22* (2013.01); *G06F 3/167* (2013.01); *H04L 63/0876* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 10,812,908 B1* | 10/2020 | Gorsica | H04M 1/72454 |
| 11,455,998 B1* | 9/2022 | Nadig | G10L 15/22 |
| 11,917,386 B2* | 2/2024 | Dyonisio | H04R 1/403 |
| 2014/0204174 A1* | 7/2014 | Karimi-Cherkandi | H04N 21/6543 348/14.12 |
| 2015/0371529 A1* | 12/2015 | Dolecki | G06F 1/1694 700/94 |
| 2019/0012069 A1* | 1/2019 | Bates | H04N 21/2387 |
| 2020/0379714 A1* | 12/2020 | Graham | H04S 7/40 |
| 2021/0029452 A1* | 1/2021 | Tsoi | H04L 65/60 |
| 2021/0280186 A1* | 9/2021 | Mahadeva | G10L 15/22 |
| 2022/0261212 A1* | 8/2022 | Wilberding | H04R 1/1083 |
| 2022/0345948 A1* | 10/2022 | Fang | H04W 4/80 |

* cited by examiner

*Primary Examiner* — Nafiz E Hoque
(74) *Attorney, Agent, or Firm* — Gray Ice Higdon

(57) ABSTRACT

Implementations relate to transferring actions from a shared device to a personal device that is associated with an account of a user. Some implementations relate to determining that a request is associated with sensitive information, determining that one or more other users are co-present with the shared device, and transferring the request that is related to sensitive information to a personal device of the user. Some implementations relate determining that a user is no longer co-present with a shared device that is currently performing one or more actions and transferring one or more of the actions to a personal device that is associated with an account of the user.

19 Claims, 14 Drawing Sheets

TRANSFERRING ACTIONS FROM A SHARED DEVICE TO A PERSONAL DEVICE ASSOCIATED WITH AN ACCOUNT OF A USER

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an explicit input (e.g., commands, queries, and/or requests) to the automated assistant that can cause the automated assistant to generate and provide responsive output, to control one or more Internet of things (IoT) devices, and/or to perform one or more other functionalities (e.g., assistant actions). This explicit input provided by the user can be, for example, spoken natural language input (i.e., spoken utterances) which may in some cases be converted into text (or other semantic representation) and then further processed, and/or typed natural language input.

SUMMARY

Implementations disclosed herein relate to initiating an action on a first device and re-routing the action to a second device based on determining that the second device is associated with the user that initiated the action on the first device. Specifically, implementations disclosed herein relate to receiving a request to perform an action on a first device, determining that a second device is better suited to continue performance of the action at a subsequent time, and causing a second device to continue performance of the action (or one or more subsequent actions in a series of actions) on a different associated device. Thus, the user can continue performance of an action or a subsequent action without explicitly indicating to an automated assistant to transfer subsequent actions to a different device.

As an example, a user may request, via an utterance that includes a request, that a device begin performance of an action, such as "OK Assistant, play my morning music playlist." In response, the automated assistant executing on a kitchen speaker device in the kitchen of the user can initiate playback of a playlist of songs that the user has previously designated as a "morning music playlist." Subsequently, the user may leave the kitchen (e.g., exit the house to go to work), thereby moving to a location that is out of audible range of the device that is executing the "morning playlist" playback. Further, the user may equip headphones (e.g., place the headphones on the user's ear while the headphones are in an active mode such that audio rendered can be provided via the speakers of the headphones) that are paired with a personal device of the user while leaving the house. In response, the automated assistant can determine that the user is no longer co-present with the kitchen device and is further co-present with the headphones and personal device of the user. In response, the playback of the "morning playlist" can be continued via the paired headphones while playback of the "morning playlist" can be stopped via the kitchen device.

In some implementations, determining to transition continuation of an action from a first device (e.g., a "public" device that is audible to anyone within range of the device) to a personal device (e.g., a "private" device that is audible to only the user) can be based on identifying that the user is no longer co-present with the public device and is instead co-present with the private device. For example, when the user utters a request to the public device, such as "play my morning playlist," the automated assistant can utilize one or more techniques, such as text dependent or text independent speaker verification to generate a profile of the speaker of the utterance. The voice profile of the user can be compared to known voice profiles of users to identify an account of the user that uttered the request. For example, a vector can be generated in an embedding space that represents the speaker uttering the phrase "OK Assistant" and the vector can be compared to vectors representing users speaking the same phrase. Based on identifying the vector that most closely matches the vector of the speaker, an account can be identified that is associated with the vector that most closely matches the speaker's vector. Thus, an account of the speaker of the request (i.e., the speaker that uttered "OK Assistant") can be identified and additional information related to the speaker of the request can be utilized to identify other devices that are associated with the speaker.

As an example, a user account can indicate that the user is associated with a personal Device A. The user may initially indicate, via Device B, to initiate playback of a playlist, as previously described. Further, Device B can determine that the user is co-present with the device via one or more sensors of the device, such as a microphone and/or camera of the device. At some subsequent time, the user may move away from Device B, which can be detected by one or more sensors of Device B, as previously described. When the user relocates away from Device B, one or more devices that are associated with an account of the user can be identified. Those devices can be polled to determine whether the user is now co-present with one of those devices (e.g., has activated headphones that are paired with a smartphone). By determining that the user is now co-present with another associated device, continuation of playback of the requested playlist can be rerouted to the personal device of the user.

In some implementations, rerouting of an action or one or more actions in a series of actions can occur based on determining that a personal device is more appropriate for one or more actions than a public device. For example, a series of actions that are rendered by the automated assistant can include one or more actions that elicit sensitive information from the user and/or include sensitive information from the user. In those instances, the action can be rendered via a personal device that is associated with the account of the user and/or the user may be prompted as to whether the user would prefer to have the action (or a response to an action) to occur on a personal device rather than on a shared device that may be heard by others that are co-present with the user.

For example, a user may be co-present with one or more other users in a living room setting. The user may utter the utterance "OK Assistant, play Movie A on the TV," which can be received via a microphone of one or more shared devices in the living room (e.g., a standalone device, the television). In response, the automated assistant can determine that the movie is rentable and that further payment information is needed to continue. The automated assistant can first determine that others are co-present with the user via sensor data from one or more sensors of the automated assistant device, such as via audio analysis (e.g., determine that more than one person is audible near the shared device) and/or video analysis (e.g., video analysis of video captured by the automated assistant device that indicates that one or more other users are visible near the shred device). In response, the automated assistant can determine an identifier of the user (e.g., via facial and/or speaker recognition), identify a personal device that is associated with an account of the user (e.g., identifying an account of the user based on the determined identifier and further identifying other devices of the user), and prompt the user accordingly. For example, the automated assistant can respond with the phrase "That movie is for rent. Would you like to enter payment information via Smartphone A?" The user can respond affirmatively and a prompt for payment information can be rendered privately (e.g., visually rendered via an interface) on the personal device rather than via the shared device where payment information may be accessible to others that are present.

In some implementations, co-present users may each utter requests to a shared device to perform one or more actions and the actions can be queued for performance in sequence. For example, a music playback application can be executing on a shared device and a first user can request "OK Assistant, play songs A, B, and C." A second user can utter the request "OK Assistant, add songs D, E, and F to the playlist." In response, the automated assistant can cause a playlist to be generated that includes Songs A, B, C, D, E, and F, which may be played in some order via the shared device. Subsequently, the first user can leave the room and equip headphones that are paired with a smartphone of the user. The automated assistant executing on the shared device can determine that the first user is no longer co-present with the shared device based on sensor data generated by sensors of the shared device, as previously described. Further, the automated assistant can identify the personal device of the first user based on determining an identifier of the first user, identifying an account of the first user based on the identifier, and further identifying the personal device of the first user that is associated with the account of the first user. Based on co-presence of the first user with the personal device, Songs A, B, and C (if they have not already been played) can be rendered via the personal device and further, Songs A, B, and C can be removed from the playlist that is playing on the shared device. Thus, the requests of the first user to perform the actions of playing particular songs can be performed on the shared device while the user is present and played on the personal device of the user when the user is no longer co-present.

Implementations described herein conserve computing resources by reducing the number of requests that are required to be processed in order to transfer performance of actions from a first device to a second device. For example, a user is not required to request to transfer playback of music to a personal device device from a shared device when the user is no longer co-located with the shared device. Instead, transfer of playback occurs without further input from the user. Further, implementations described herein improve security of security of sensitive information by rendering sensitive information and/or prompts for sensitive information to a personal device of a user while a user is co-present with other users. Thus, sensitive information remains secured with personal devices that are associated with an account of the user, and in some instances, only devices that are configured to handle sensitive information can be utilized to receive sensitive information of the user in lieu of eliciting the sensitive information via a shared device that may not be secured and/or may be accessible by others.

DETAILED DESCRIPTION

Figure 1:
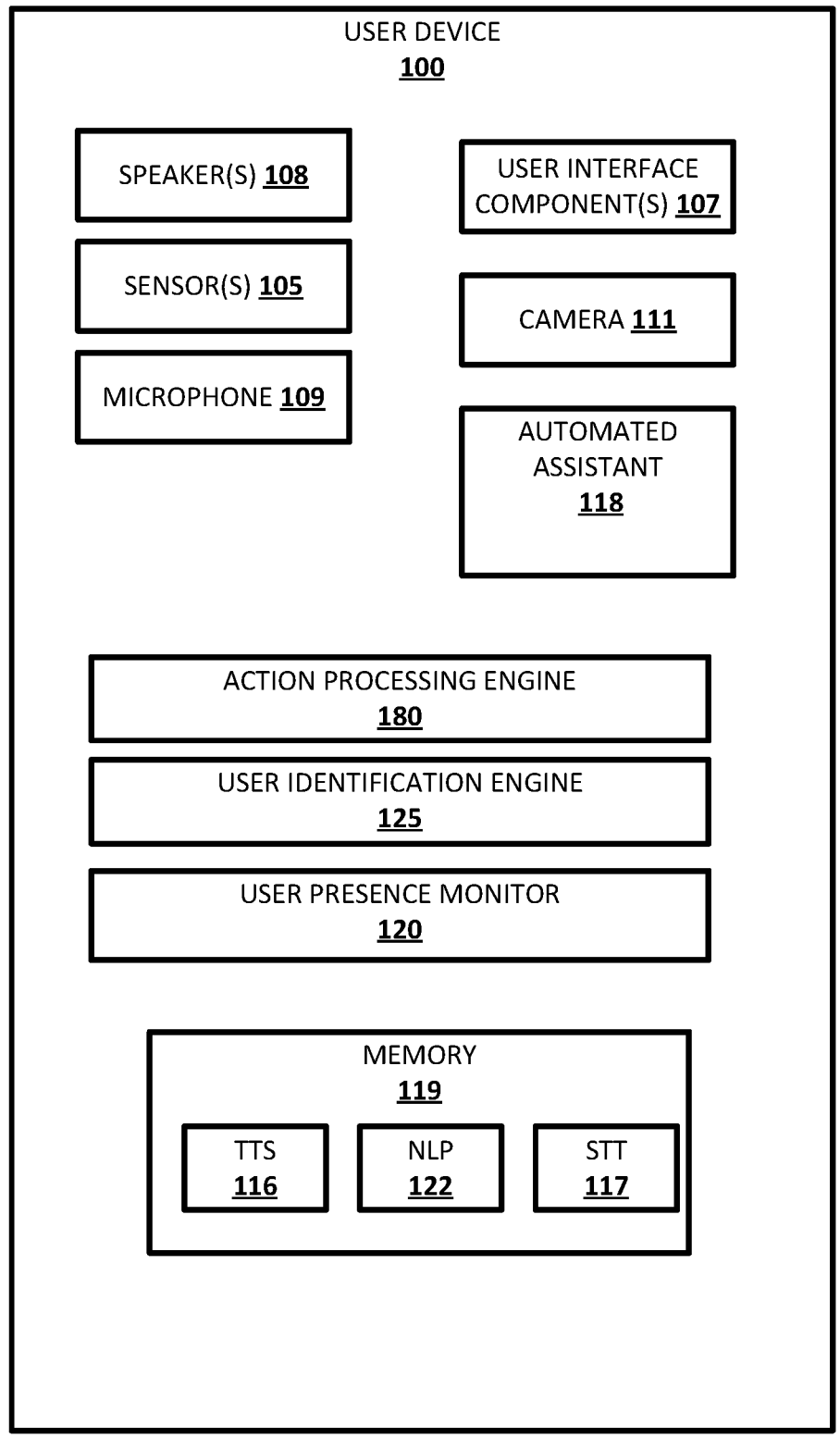
FIG. 1 is a block diagram of an example environment in which implementations disclosed herein may be implemented.

Turning now to FIG. 1, an example environment in which techniques disclosed herein may be implemented is illustrated. The example environment includes a user device 100 having memory 119. User device 100 can execute a respective instance of a respective automated assistant client 118. However, in some implementations, user device 100 can optionally lack an instance of the respective automated assistant client 118, and still include engine(s) and hardware components for receiving and processing user input directed to an automated assistant (e.g., microphone(s) 109, speaker (s) 108, speech recognition engine(s), natural language processing engine(s), speech synthesis engine(s), and so on). An instance of an automated assistant client 118 can be an application that is separate from an operating system of the user device 100 (e.g., installed "on top" of the operating system)—or can alternatively be implemented directly by the operating system of the user device 100. As described further below, the automated assistant client 118 can optionally interact with one or more cloud-based automated assistant components in responding to various requests provided by respective user interface components 107 of the respective user device 100. Further, and as also described below, other engine(s) of the user device 100 can optionally interact with one or more of the cloud-based automated assistant components. Still further, user device 100 can have any number of automated assistants executing on the user device 100.

The user device 100 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated assistant. Additional and/or alternative assistant input devices may be provided. In some implementations, a plurality of user devices 100 can be associated with each other in various ways in order to facilitate performance of techniques described herein. For example, in some implementations, a user may have an account that includes associations with multiple devices of the user, such as a smart speaker, one or more smart appliances, and a smartphone.

In various implementations, one or more user devices 100 may include one or more respective sensors 105 that are configured to provide, with approval from corresponding user(s), sensor data indicative of one or more environmental conditions present in the environment of the device. In some of those implementations, automated assistant 118 can generate fulfillment data to satisfy a spoken utterance from a user that is associated with the ecosystem. The spoken utterance can be satisfied by rendering responsive content (e.g., audibly and/or visually) at one or more of the user devices 100, by causing one or more of the user devices 100 to be controlled based on the spoken utterance, and/or by causing one or more of the user devices 100 to perform any other action to satisfy the spoken utterance.

The respective sensors 105 may come in various forms. Some user devices 100 may be equipped with one or more digital cameras that are configured to capture and provide signal(s) indicative of movement detected in their fields of view. Additionally, or alternatively, some user devices 100 may be equipped with other types of light-based sensors 105, such as passive infrared ("PIR") sensors that measure infrared ("IR") light radiating from objects within their fields of view. Additionally, or alternatively, some user devices 100 may be equipped with sensors 105 that detect acoustic (or pressure) waves, such as one or more microphones 109.

Additionally, or alternatively, in some implementations, the sensors 105 may be configured to detect other phenomena associated with the environment that includes at least a part of the ecosystem. For example, in some embodiments, a given one of the assistant devices 106 may be equipped with a sensor 105 that detects various types of wireless signals (e.g., waves such as radio, ultrasonic, electromagnetic, etc.) emitted by, for instance, other assistant devices carried/operated by a particular user (e.g., a mobile device, a wearable computing device, etc.) and/or other assistant devices in the ecosystem. For example, some of the assistant devices 106 of an ecosystem may be configured to emit waves that are imperceptible to humans, such as ultrasonic waves or infrared waves, that may be detected by one or more of the user devices 100 (e.g., via ultrasonic/infrared receivers such as ultrasonic-capable microphones). Also, for example, in some embodiments, a given one of the assistant devices 106 may be equipped with a sensor 105 to detect movement of the device (e.g., accelerometer), temperature in the vicinity of the device, and/or other environmental conditions that can be detected near the device (e.g., a heart monitor that can detect the current heart rate of the user).

Additionally, or alternatively, various assistant devices may emit other types of human-imperceptible waves, such as radio waves (e.g., Wi-Fi, Bluetooth, cellular, etc.) that may be detected by other assistant devices carried/operated by a particular user (e.g., a mobile device, a wearable computing device, etc.) and used to determine an operating user's particular location. In some implementations, GPS and/or Wi-Fi triangulation may be used to detect a person's location, e.g., based on GPS and/or Wi-Fi signals to/from the assistant device. In other implementations, other wireless signal characteristics, such as time-of-flight, signal strength, etc., may be used by various assistant devices, alone or collectively, to determine a particular person's location based on signals emitted by the other assistant devices carried/operated by the particular user.

Additionally, or alternatively, in some implementations, one or more of the user devices 100 may perform speaker recognition to recognize a user from their voice. For example, some instances of the automated assistant may be configured to match a voice to a user's profile, e.g., for purposes of providing/restricting access to various resources. Various techniques for user identification and/or authorization for automated assistants have been utilized. For example, in identifying a user, some automated assistants utilize text-dependent techniques (TD) that is constrained to invocation phrase(s) for the assistant (e.g., "OK Assistant" and/or "Hey Assistant"). With such techniques, an enrollment procedure is performed in which the user is explicitly prompted to provide one or more instances of a spoken utterance of the invocation phrase(s) to which the TD features are constrained. Speaker features (e.g., a speaker embedding) for a user can then be generated through processing of the instances of audio data, where each of the instances captures a respective one of the spoken utterances. For example, the speaker features can be generated by processing each of the instances of audio data using a TD machine learning model to generate a corresponding speaker embedding for each of the utterances. The speaker features can then be generated as a function of the speaker embeddings, and stored (e.g., on device) for use in TD techniques. For example, the speaker features can be a cumulative speaker embedding that is a function of (e.g., an average of) the speaker embeddings. Text-independent (TI) techniques have also been proposed for utilization in addition to or instead of TD techniques. TI features are not constrained to a subset of phrase(s) as is in TD. Like TD, TI can also utilize speaker features for a user and can generate those based on user utterances obtained through an enrollment procedure and/or other spoken interactions, although many more instances of user utterances may be required for generating useful TI speaker features.

After the speaker features are generated, the speaker features can be used in identifying the user that spoke a spoken utterance. For example, when another spoken utterance is spoken by the user, audio data that captures the spoken utterance can be processed to generate utterance features, those utterance features compared to the speaker features, and, based on the comparison, a profile can be identified that is associated with the speaker features. As one particular example, the audio data can be processed, using the speaker recognition model, to generate an utterance embedding, and that utterance embedding compared with the previously generated speaker embedding for the user in identifying a profile of the user. For instance, if a distance metric between the generated utterance embedding and the speaker embedding for the user satisfies a threshold, the user can be identified as the user that spoke the spoken utterance.

Each of the user devices 100 further includes respective user interface component(s) 107, which can each include one or more user interface input devices (e.g., microphone, touchscreen, keyboard, and/or other input devices) and/or one or more user interface output devices (e.g., display, speaker, projector, and/or other output devices). As one example, user interface components 107 of user device 100 can include only speaker(s) 108 and microphone(s) 109, whereas user interface components 107 of another user device 100 can include speaker(s) 108, a touchscreen, and microphone(s) 109.

Each of the user devices 100 may include one or more memories 119 for storage of data and software applications, one or more processors 112 for accessing data and executing applications, and other components that facilitate communication over a network. The operations performed by one or more of the user devices 100 and/or by the automated assistant 118 may be distributed across multiple computer systems. The automated assistant may be implemented as, for example, computer programs running on one or more computers in one or more locations that are coupled to each other through a network.

Automated assistant client 118 may include a respective speech capture/text-to-speech (TTS)/speech-to-text (STT) module 114. In other implementations, one or more aspects of the respective speech capture/TTS/STT module(s) may be implemented separately from the respective automated assistant client 118 (e.g., stored in memory 119 and accessible to one or more of the automated assistants executing on the automated assistant device).

Each respective speech capture/TTS/STT modules 116 and/or 117 may be configured to perform one or more functions including, for example: capture a user's speech (speech capture, e.g., via respective microphone(s) 109); convert that captured audio to text and/or to other representations or embeddings (STT) using speech recognition model(s) stored in a database; and/or convert text to speech (TTS) using speech synthesis model(s) stored in a database. Instance(s) of these model(s) may be stored locally, in memory 119, at each of the respective user devices 100 and/or accessible by the assistant input devices (e.g., over one or more networks). In some implementations, because one or more of the user devices 100 may be relatively constrained in terms of computing resources (e.g., processor cycles, memory, battery, etc.), the respective speech capture/TTS/STT modules that are local to each of the user devices 100 may be configured to convert a finite number of different spoken phrases to text (or to other forms, such as lower dimensionality embeddings) using the speech recognition model(s). Other speech input may be sent to one or more of the cloud-based automated assistant components.

STT module 117 may be configured to convert audio data captured by the automated user device 100 into text (which may then be provided to natural language processing (NLP) module 122) using speech recognition model(s). TTS module 116 may be configured to convert textual data (e.g., text formulated by automated assistant) into computer-generated speech output using speech synthesis model(s). In some implementations, the TTS module 116 may provide the computer-generated speech output to one or more of the assistant devices 106 to be output directly, e.g., using respective speaker(s) 108 of the respective assistant devices. In other implementations, textual data (e.g., a client device notification included in a command) generated by the automated assistant TTS module 116 may be provided to a speech capture/TTS/STT module of a respective automated assistant, which may then locally convert the textual data into computer-generated speech using the speech synthesis model(s), and cause the computer-generated speech to be rendered via local speaker(s) 108 of the respective assistant devices.

The NLP module 122 processes natural language input generated by users via the user device 100 and may generate annotated output for use by automated assistant 118. For example, the NLP module 122 may process natural language free-form input that is generated by a user via one or more respective user interface input devices of the user devices 100. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations—such as an assistant input device notification rendered immediately prior to receiving the natural language input on which the assistant input device notification is based.

In some implementations, the automated assistant executing on one of the devices of the ecosystem of devices can be invoked by the user performing an action (e.g., touching the device, performing a gesture that is captured by a camera of the device) and/or uttering an invocation phrase that indicates that the user has interest in the automated assistant performing one or more actions. For example, the user can utter "OK Kitchen Assistant," and the automated assistant of a kitchen speaker can process audio that precedes and/or follows the invocation to determine whether a request is included in the audio data. Audio data that is captured by the microphones of the kitchen speaker can be processed, utilizing STT, NLP, and/or ASR, by the automated assistant client that was invoked.

Upon determining that the audio data includes a request, action processing engine 180 (shown in FIG. 1 as a component of memory 119, but can additionally or alternatively be a component of automated assistant client 118 and/or 120) can determine one or more actions to perform and cause performance of the action(s). For example, the user may utter "OK Kitchen Assistant," followed by "how tall is Barack Obama." In response, action processing engine 180 can generate a response to the request (or "query") and provide, via the microphone(s) 109 of user device 100, a response to the query.

In some implementations, a user may speak an utterance that includes a request for an automated assistant to perform one or more actions. For example, a user may request that an automated assistant perform an ongoing action (e.g., play music and/or start a playlist of multiple songs), perform a series of actions (e.g., perform a routine that includes the performance of multiple actions in a particular order), and/or other request for an automated assistant to perform an ongoing action. For example, referring to FIG. 2, an example environment is illustrated that includes a user 201 and a shared device 205. The shared device 205 can include one or more of the components that are illustrated in FIG. 1 with regards to user device 100. The user 201 utters a phrase 250 of "OK Assistant, play my morning playlist." In response, the automated assistant executing on shared device 205 can process the utterance (e.g., process the audio data captured by one or more microphones of shared device 205), and determine one or more actions to perform. For example, action processing engine 180 can determine an action of playing the first song in a playlist that the user has previously designated as "Morning Playlist." The determined action can include one or more follow-up actions, such as playing the songs in the "Morning Playlist" in sequence.

Figure 2:
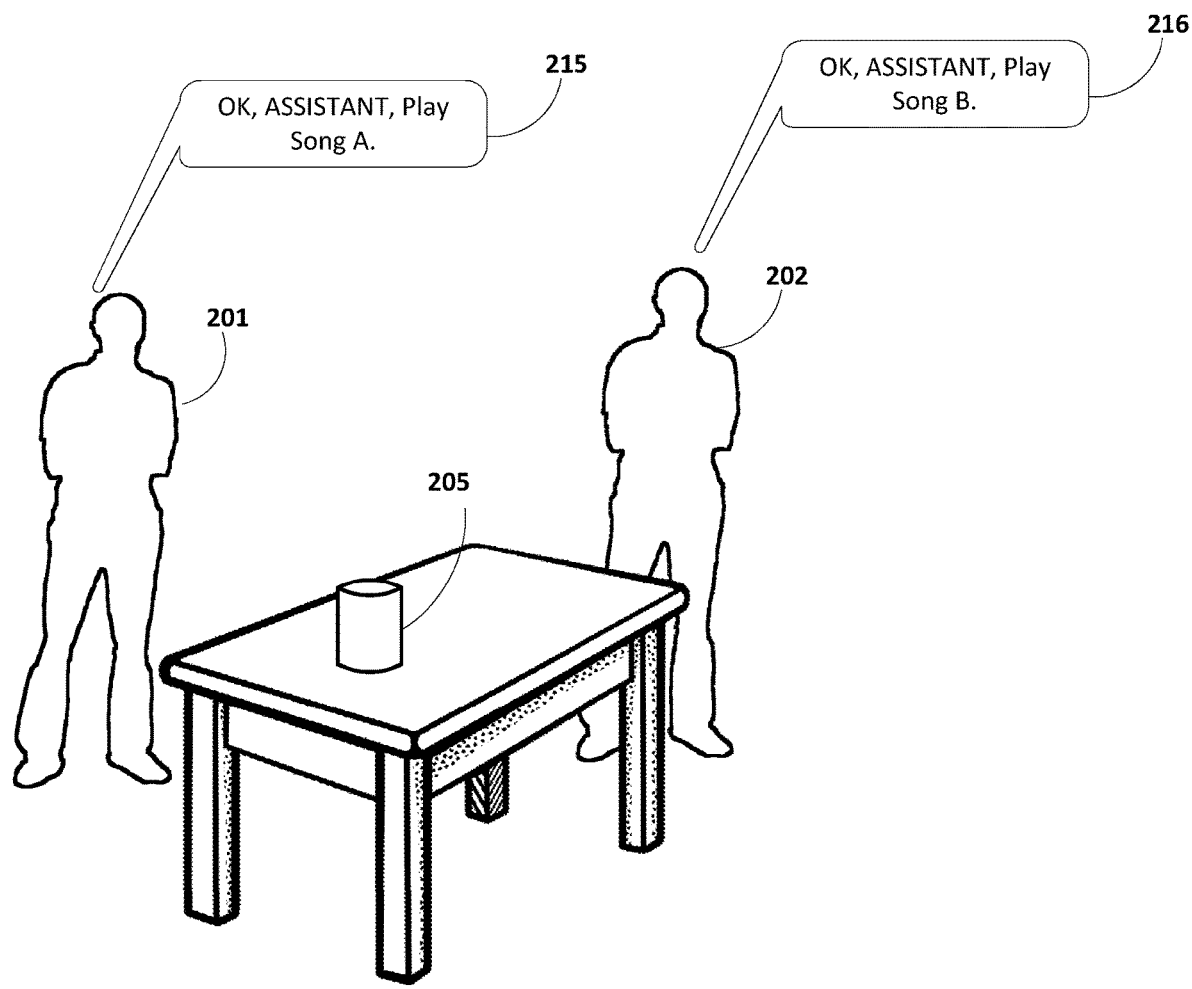
FIG. 2 is an illustration of two users that are co-present with a shared device.

In some implementations, a user device 100 can determine whether one or more users are within proximity of the user device 100. For example, user presence monitor 120 can utilize audio data generated by microphone 109, visual data generated by camera 111, and/or other sensor data generated by sensors 105 to determine whether one or more users are co-present with the user device 100. As illustrated in FIG. 2, shared device 205 may identify that a user 201 is present based on the user speaking an utterance, based on processing visual data captured by a camera of shared device 205, and/or based on sensor data from one or more other sensors of shared device 205. Further, based on data generated by one or more sensors, including microphones and/or cameras, user presence monitor 120 can further identify that one or more others users 202 are also co-present. For example, based on processing audio data, user presence monitor 120 may determine that more than one user is speaking. User presence monitor 120 can determine, based on visual data, that multiple objects are visible that are likely humans are visible and/or user presence monitor 120 can determine that audio data includes a first voice of a first user and a second voice of a second user. The users that are present can either utter requests that are directed to the automated assistant and/or one or more of the voices can be background noise that is captured while a user utters a request that is directed to the automated assistant. For example, referring again to FIG. 2, user 201 has uttered a request 215 of "OK Assistant, Play Song A," thereby invoking the automated assistant. Subsequently, user 202 has uttered the request 216 "OK Assistant, Play Song B," thereby invoking the automated assistant again. User presence monitor 120 may map one or more features of the utterance that includes the voice of user 201 and further map one or more features of the utterance that includes the voice of user 202 in an embedding space and determine that the two utterances map to difference locations in the embedding space, thereby indicating that the utterances were spoken by different users.

Referring again to FIG. 1, user identification monitor 125 can determine an identifier that is associated with a user based on sensor data that is captured by one or more sensors 105 of the user device, including the microphones 109 and/or camera 111. For example, user identification engine 125 may be configured to match a voice to a user's profile. Various techniques for user identification and/or authorization for automated assistants have been utilized. For example, in identifying a user, some automated assistants utilize text-dependent techniques (TD) that is constrained to invocation phrase(s) for the assistant (e.g., "OK Assistant" and/or "Hey Assistant"). With such techniques, an enrollment procedure is performed in which the user is explicitly prompted to provide one or more instances of a spoken utterance of the invocation phrase(s) to which the TD features are constrained. Speaker features (e.g., a speaker embedding) for a user can then be generated through processing of the instances of audio data, where each of the instances captures a respective one of the spoken utterances. For example, the speaker features can be generated by processing each of the instances of audio data using a TD machine learning model to generate a corresponding speaker embedding for each of the utterances. The speaker features can then be generated as a function of the speaker embeddings, and stored (e.g., on device) for use in TD techniques. For example, the speaker features can be a cumulative speaker embedding that is a function of (e.g., an average of) the speaker embeddings. Text-independent (TI) techniques have also been proposed for utilization in addition to or instead of TD techniques. TI features are not constrained to a subset of phrase(s) as is in TD. Like TD, TI can also utilize speaker features for a user and can generate those based on user utterances obtained through an enrollment procedure and/or other spoken interactions, although many more instances of user utterances may be required for generating useful TI speaker features.

After the speaker features are generated, the speaker features can be used in identifying the user that spoke a spoken utterance. For example, when another spoken utterance is spoken by the user, audio data that captures the spoken utterance can be processed to generate utterance features, those utterance features compared to the speaker features, and, based on the comparison, a profile can be identified that is associated with the speaker features. As one particular example, the audio data can be processed, using the speaker recognition model, to generate an utterance embedding, and that utterance embedding compared with the previously generated speaker embedding for the user in identifying a profile of the user. For instance, if a distance metric between the generated utterance embedding and the speaker embedding for the user satisfies a threshold, the user can be identified as the user that spoke the spoken utterance.

Figure 3:
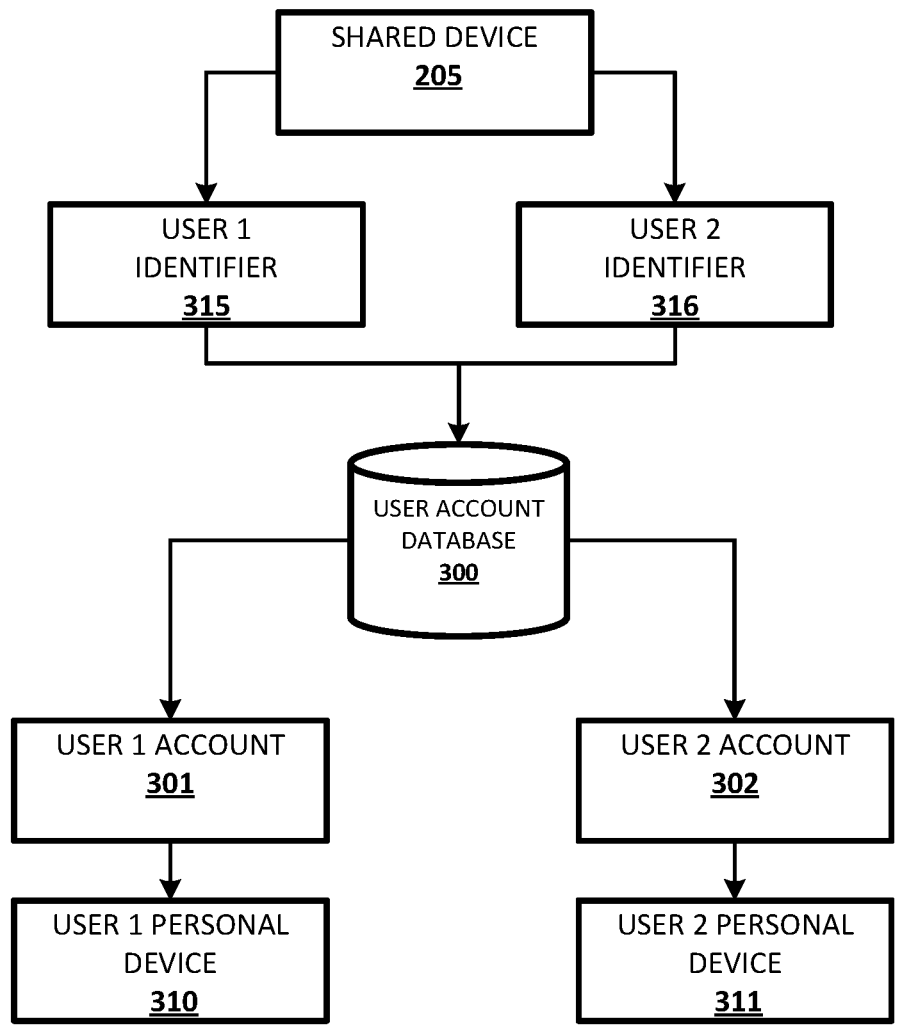
FIG. 3 is a flowchart illustrating an example method according to various implementations disclosed herein.

Once an account and/or profile of a user has been identified, other devices that are associated with the user's profile can be identified. For example, referring to FIG. 3, users 201 and 202 can both be co-present with the shared device 205 of FIG. 2 and both speaking such that the microphones of shared device 205 can capture utterances of both of the users. In response, user identification monitor 125 can determine a user identifier for each of the users based on utterances from the users. For example, User 1 identifier 315 can be generated from utterance 215 and User 2 identifier 316 can be generated from utterance 316. For each of the identifiers, user account database 300 can be accessed, utilizing the generated identifiers, to identify accounts that are associated with each of the users. For example, User 1 account 301 can be identified based on identifying an account in user account database 300 that is associated with User 1 identifier 315. Similarly, User 2 account 302 can be identified based on identifying an account in user account database 300 that is associated with User 2 identifier 316.

For each of the accounts in user account database 300, one or more other devices can be associated with the user via the account. For example, a user may have a shared device, such as a smart speaker, that is associated with a user account, and may further have a smartphone that is associated with the same account. In some implementations, the devices associated with a user may be designated as "shared" or "public" and "personal" or "private" to indicate a level of security for the device and/or an indication of trust in the security of the device that has been indicated by the user. For example, a personal device may be a device that does not include external speakers (e.g., speakers that can be heard by users other than the primary user), a device with enhanced security measures (e.g., encryption of sent and/or received data), a device with a single user account (e.g., only accessible by a single user), and/or a device that otherwise is determined to be more secure than a device that is available for multiple users to utilize (e.g., a device with authentication mechanisms, such as password protected, that may be accessible to multiple users).

For example, referring again to FIG. 3, User 1 account 301 can be identified based on User 1 identifier, which was generated based on an utterance 215 from user 201 (see FIG. 2). In addition to the shared device 205, User 1 Account 301 is associated with User 1 personal device 310, which can be, for example, a smartphone, headphones, a device that is only accessible to the user via one or more security measures, and/or a device with security features that are designated, by the user and/or by default, as "personal" and/or "private" to the user. A personal device of a user may include one or more components of the user device 100 illustrated in FIG. 1. For example, a personal device can include an automated assistant 118, one or more sensors 105, including microphones 109 and/or camera(s) 11, user interface components 107, and one or more other components for processing requests and/or rendering responses, such as action processing engine 180 and memory components 119. In some implementations, one or more components may be absent. For example, a personal device may not be configured to receive and process requests, but may be configured to fulfill requests that are generated by other devices and provided to the personal device.

Figure 4A:
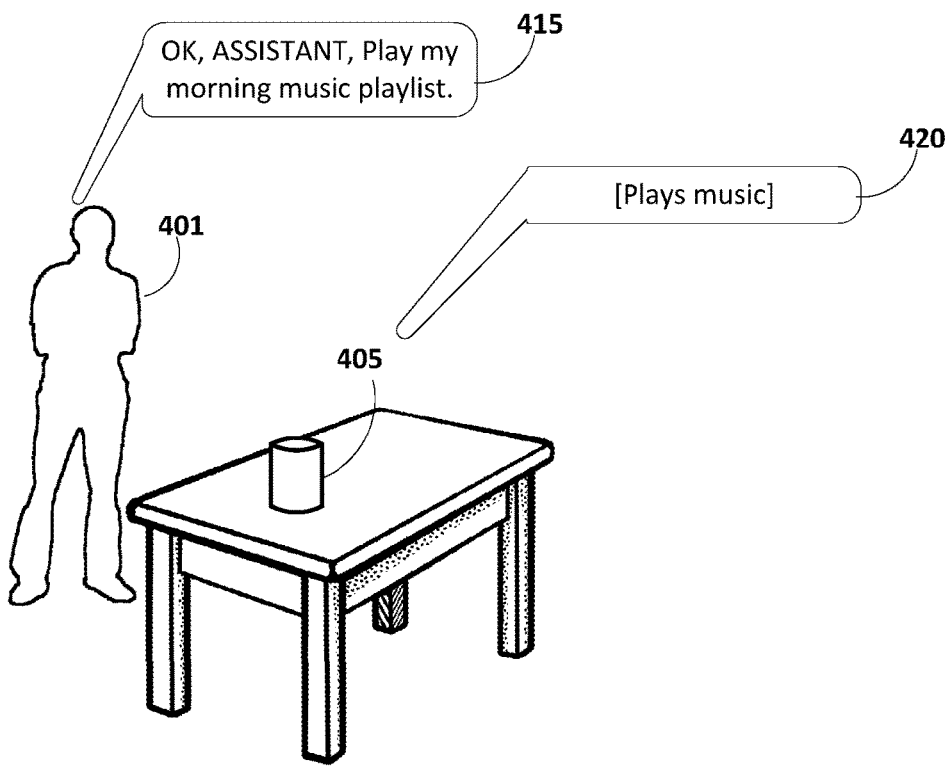
FIG. 4A and FIG. 4B illustrate a user that is co-present and no longer co-present with a shared device.

In some implementations, a user may initiate one or more actions via a shared device and subsequently relocate to a different location while the one or more actions is being performed by the shared device. By relocating, the user may no longer be able to hear the shared device. However, the user may be co-located with another device that is configured and/or capable of continuing performance of the actions that have not been performed by the shared device. For example, referring to FIG. 4A, a user may be present with a shared device 405. The user may utter a request of "OK Assistant, play my morning music playlist" 415, which can be processed by the automated assistant executing on the shared device 405. In response, the shared device 405, via one or more speakers, can initiate performance of one or more songs that constitute a "morning music playlist" 420.

Alternatively and/or additionally, in some implementations, the user can perform an action that indicates and/or suggests that the user can no longer hear the shared device 405 and/or no longer has interest in listening to the shared device 405. For example, the user may put on headphones, indicating an interest in listening to the headphones and not to other devices. Thus, by equipping headphones (e.g., activating headphones with the intention of utilizing the headphones), the user can be handled similar to a user that has relocated to a location where the shared device is not audible.

Figure 4B:
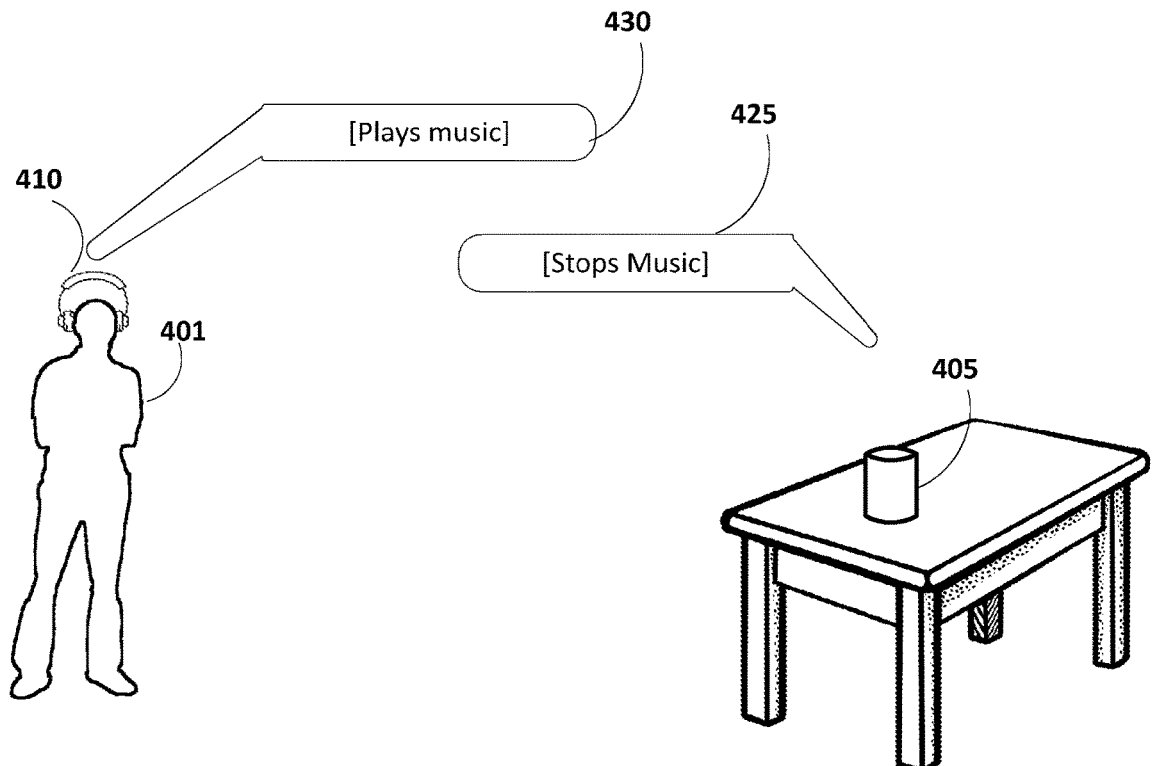

Subsequently, the user may change locations such that the user is no longer co-present with the shared device 405. Referring to FIG. 4B, the user 401 can be now located at least a threshold distance from the shared device 405. Further, as illustrated, the user has equipped headphones 410, which may be paired to a personal device and/or may be a personal device (e.g., may have at least some processing capabilities, such as an automated assistant client and/or at least some of the capabilities of the user device 100 of FIG. 1). While playing the music playlist, shared device 405 may monitor to determine whether the user 401 is present, such as by periodically processing audio data to determine whether the user can be identified, processing visual data to determine whether the user is visible, and/or by processing sensor data from one or more other sensors of the shared device 405. Further, while processing audio, visual, and/or sensor data, shared device 405 can determine, via user identification engine 125, an identifier of the user 401, as previously described. Subsequently, when shared device 405 determines that the user 401 is no longer present, user identification engine 125 can identify an account of the user 405, as previously described with regards to FIG. 3. The user identification engine 125 can determine that the user has one or more other devices that are associated with an account, which may include, for example, headphones 410 (or a device paired with headphones 410). Further, headphones 405 may determine that the user is co-present with the headphones 410 and/or has equipped the headphones 410. In response, shared device 425 stops performing the actions the requested actions (i.e., music playback) and headphones 410 can continue the actions 430 that the shared device 425 was previously performing.

Figure 5A:
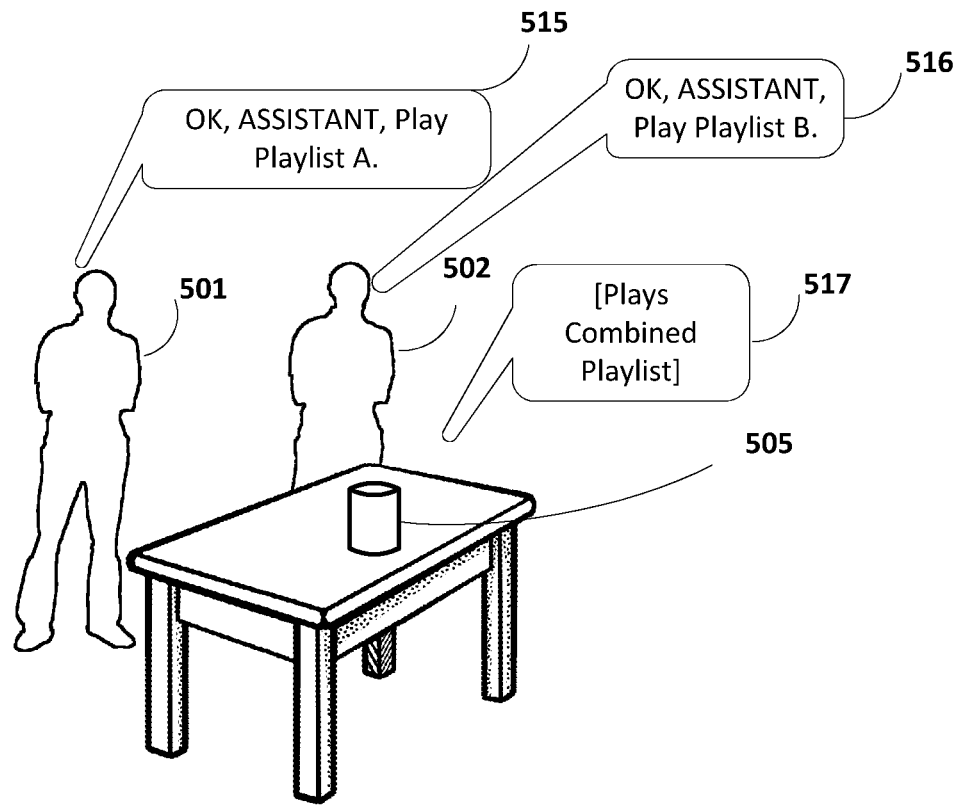
FIG. 5A and FIG. 5B illustrate a shared device performing a superset of actions while two users are co-present with the shared device.

In some implementations, multiple users may utilize a shared device to perform multiple series of actions. For example, referring to FIG. 5A, a first user 501 and a second user 502 can both interact with the automated assistant that is executing on shared device 505. As illustrated, the first user 501 utters a request 515 to play "Playlist A," which can include a plurality of songs, resulting in a plurality of actions to perform (i.e., playing the multiple songs of "Playlist A"). Further, the second user 502 can utter a request 516 to play a second playlist named "Playlist B" which can also include multiple songs to play. In response, the shared device 505 plays a playlist that includes both the songs from "Playlist A" and "Playlist B."

In addition to playing the playlist, user identification engine 125 of shared device 505 can determine an identifier of the first user 501 and the second user 502. In some implementations, this can include processing audio data, visual data, and/or other sensor data to determine an identifier of each user, which can further be utilized to identify an account associated with each user, as previously described and illustrated in FIG. 3. In some implementations, "Playlist A" can be identified from the account associated with the first user 501 and "Playlist B" can be identified from the account associated with the second user 502.

Subsequently, the second user 502 changes locations such that the second user 502 is no longer co-present with the shared device 505. User presence monitor 130 can determine that the second user 502 is no longer co-present by processing audio data, visual data, and/or other sensor data to determine that only the first user 501 is present with the shared device 505. In response, automated assistant 118 can identify, based on the account of the second user 502, that a personal device 510 is associated with the second user 510. A user presence monitor 130 of the personal device 510 can provide one or more indications that the second user 502 has equipped the personal device 510. For example, when the second user 502 equips and/or activates the headphones 510 (i.e., the personal device and/or a device paired with the personal device), the personal device 510 can provide an indication that is identifiable via the account of the second user 502 that indicates the second user 510 is utilizing the device 510.

In response, automated assistant 118 of the shared device 505 can provide to the personal device 510 indications of the actions that were requested by the second user and that have not yet been performed (e.g., the songs of "Playlist B" that have not been played). Those songs that then be played 530 via personal device 510 and the remaining actions, requested by the first user 501, can be played via shared device 505 while the user continues to be present with the shared device 505.

In some implementations, an action that is to be performed via a shared device can include sensitive information and/or can be a request for additional information that is determined to be sensitive. For example, a request can be for payment information that a user may not want to provide via a shared device due to the less secure configuration of the shared device. Instead, a personal device may be more appropriate for providing and/or requesting the sensitive information based on the personalized speaker and/or interface of the personal device being accessible only to the user and/or based on security measures of the personal device (e.g., data encryption). If another user is co-present with the shared device, the automated assistant that is executing on the shared device can determine an identifier of the user, identify an account of the user, and further identify a personal device of the user. The user can then be prompted as to whether the action should be performed via the personal device and, if indicated to do so, the action can be performed via the personal device.

Figure 6:
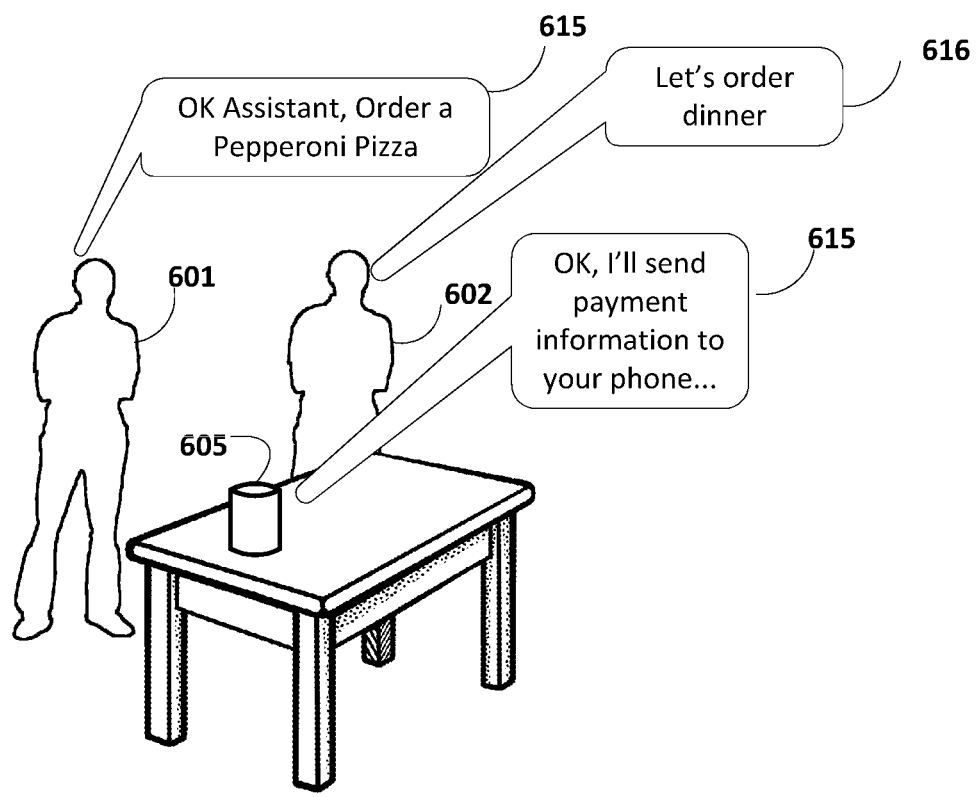
FIG. 6 illustrates a shared device transferring sensitive information to a personal device associated with an account of the user.

For example, referring to FIG. 6, a first user 601 and a second user 602 are present with a shared device 605. Both the first user 601 and the second user 602 have uttered phrases 615 and 616, which can be captured by one or more microphones of shared device 605. In response, user presence engine 120 of shared device 605 can determine, utilizing one or more techniques previously described, that there are at least two users present. Further, user identification engine 125 can determine an identifier for one or more of the users. For example, 601 may have previously configured voice detection and one or more features of the voice of the first user 601 can be compared to features of at least a portion of utterance 615 (e.g., TI or TD speech recognition).

As illustrated, the first user 601 has requested that the automated assistant executing on shared device 605 order a pizza, which requires payment information. Further, the second user 602 has spoken an utterance 616 that can also be captured by the shared device 605. User presence monitor 120 can process the captured audio data and determine that multiple users are currently co-present with the shared device 605. Also, for example, shared device 605 may include a camera and/or other sensors that can generate data that, when processed, can be utilized by user presence monitor 120 to determine that multiple users are present. Further, user identification engine 125 can determine an identifier for one or more of the users, as previously described. For the spoken utterance 615, action processing engine 180 can determine an action to perform, such as providing information to an application that is configured to order food.

In some implementations, automated assistant 118 may determine that a response includes sensitive information and/or a response includes a request for the user to provide sensitive information. As illustrated, the shared device 605 is requesting that the user 601 provide payment information for the food requested in utterance 615. Instead of providing the request for payment information via the shared device 605, which is accessible by the second user 602, the shared device can determine an identifier of the first user 601, as previously described, further identify an account of the first user 601, and further identify another device that is associated with the account, such as a smartphone that is personal to the user and not accessible to the second user 602 (or other users).

In some implementations, the shared device may first notify the user that the upcoming request is for sensitive information and inquire as to whether the user would like the request transferred to a personal device. For example, the shared device may first provide a response of "I need payment information. Would you like to provide that using your smartphone?" If the user responds affirmatively, the request can be provided via the personal device such that it is more secure than being provided via the shared device (e.g., provided via an interface rather than rendered audibly).

Figure 7:
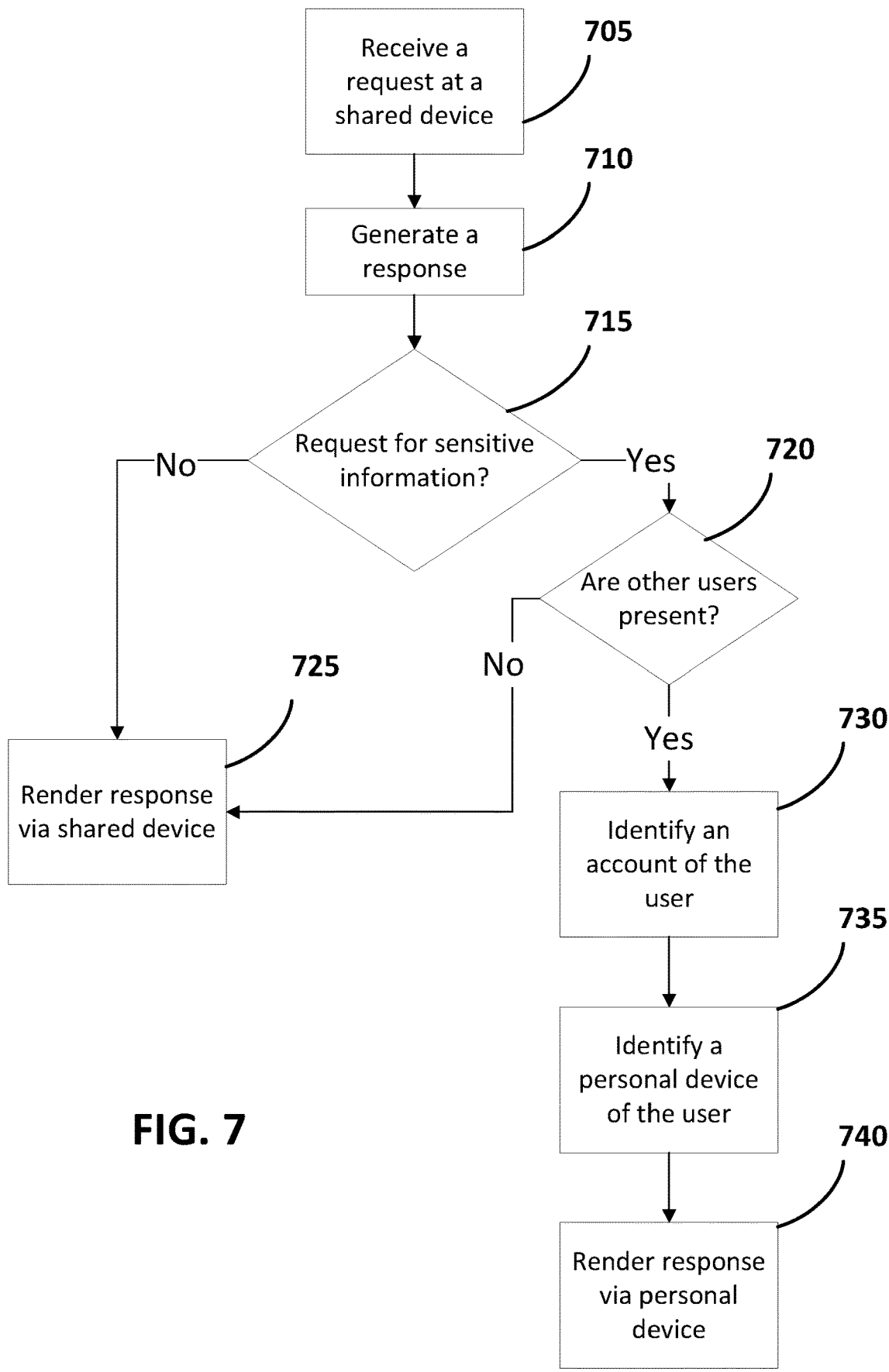
FIG. 7 is a flowchart illustrating an example method according to various implementations disclosed herein.

Referring to FIG. 7, a flowchart is provided that illustrates implementations of a method as described herein. At step 705, a request is received at a shared device. For example, in some implementations, a request may be processed by an automated assistant executing on a shared device that shares one or more characteristics with shared device 605 of FIG. 6. The request may be to perform one or more actions that can be performed by the shared device and/or by one or more other devices. For example, the request 615 of FIG. 6 is a request that may be directed to an application that is executing on shared device 605. Also, for example, a request can be directed to an action that is performed by another device, such as "OK Assistant, play a movie on living room TV."

At step 710, a response is generated. As illustrated in FIG. 6, the response 615 indicates that the request is able to be fulfilled and further prompts the user for payment information. In some implementations, generating a response can include providing request data to one or more other applications for processing (e.g., a restaurant application). As illustrated, the response is an indication that an additional response will be transferred to another device of the user. However, in some implementations, shared device 605 may render a response that includes a request to transfer a response to another device. For example, in response to "OK Assistant, order a pepperoni pizza," shared device 605 may respond with "I need your payment information. Would you like to use your phone to provide this?" In some implementations, a user account may be associated with multiple personal devices and shared device 605 can provide options to the user regarding which, of the multiple personal devices, the user has interest in the response related to sensitive information being provided. For example, the shared device 605 may respond with "I need your payment information. Would you like to provide it using this device, your smartphone, or your tablet?"

At decision block 715, the automated assistant can determine whether the response generated at step 710 includes sensitive information and/or is a request for sensitive information. For example, a request from the user to play a playlist of music can result in a response of playing the playlist. Because playing a playlist would not likely include sensitive information, at decision block 715, automated assistant 118 can determine that the request is not sensitive and render the response via the shared device at step 725.

At step 720, user presence monitor 120 can determine whether there are users co-present with the shared device 605. For example, in some implementations, user presence monitor 120 can determine that both user 601 and user 602 are co-present based on processing audio data that is captured by one or more microphones 109 of shared device 605. In some implementations, the audio data may include the user 601 uttering a request (as illustrated in FIG. 6) and further, the audio data may include another user uttering additional utterances, such as utterance 616. Thus, user presence monitor 120 can determine that a user is present that uttered a request as well as at least one other user that can be detected via the audio data. In some implementations, sensor data from one or more other sensors 105 can be utilized to detect the presence of additional users, as described herein. For example, visual data and/or other sensor data may be indicative of a second user that is present with the shared device 605. If additional users are not co-present with the shared device 605, the sensitive information can be rendered by the shared device 605 at step 725. However, in some implementations, decision block 720 may not be present and, in all instances where a response from the automated assistant and/or a request is for sensitive information, the automated assistant may continue with step 730.

At step 730, an account of the user is identified. Step 730 can be implemented as previously described herein with regards to FIGS. 1 and 2. For example, a user identification engine 125 of shared device 605 can generate one or more features based on audio data that includes the user uttering a request and further identify an account based on features that are associated with the account (e.g., embedding the features in an embedding space and determining distances between features in the embedding space). At step 735, a personal device of the user can be identified based on the account, as previously described. Further, the response can then be rendered by the personal device 740. For example, automated assistant 118 can generate fulfillment data and provide the fulfillment data to an automated assistant that is executing on the personal device of the user.

Figure 8A:
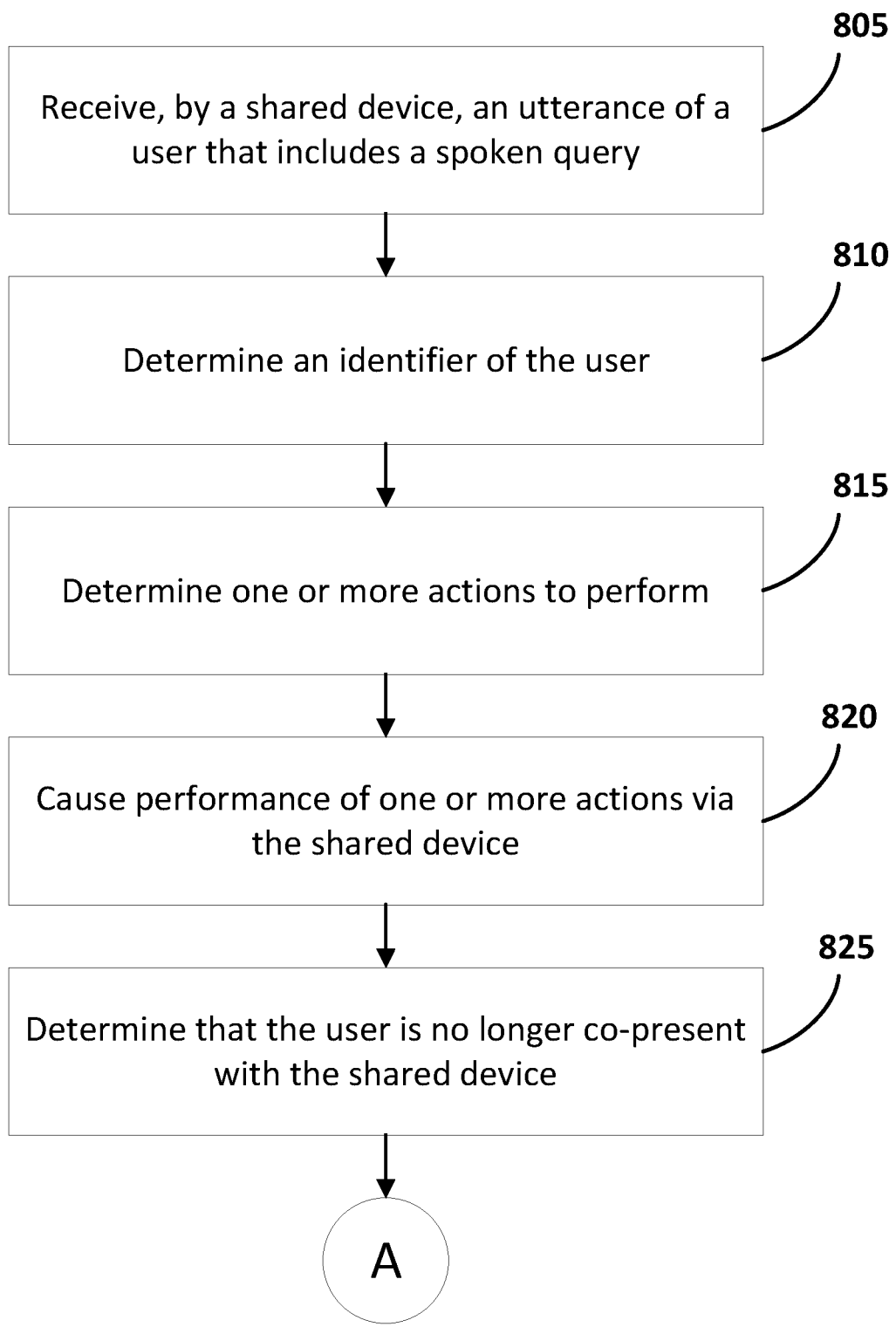
FIG. 8A and FIG. 8B is a flowchart illustrating another example method according to various implementations disclosed herein.

Referring to FIG. 8, a flowchart is provided that illustrates a method for transferring one or more actions to a personal device that is associated with the user. In some implementations, one or more steps of the method can be omitted or combined, and/or one or more additional steps can be included in the method. The method can be performed by one or more components that are illustrated in the environment of FIG. 1.

At step 805, a shared device receives an utterance that includes a spoken query. The utterance can be received via audio data that is captured by one or more microphones of a shared device that shares one or more characteristics with the environment illustrated in FIG. 1 and described with regards to FIGS. 4A and 4B. In some implementations, the user can request an action that occurs over a period of time. For example, the user may utter the request of "OK Assistant, play my playlist" and a plurality of songs that comprise the "playlist" may be subsequently played by the shared device, as further described with regards to step 815 and step 820.

At step 810, an identifier of the user is determined. In some implementations, the identifier can be one or more features that are determined based on the audio data of the user requesting an action to be performed. For example, a user identification engine 180 of a shared device can process audio data and determine one or more features of the user. The features can be embedded in an embedding space and compared to other features. For example, the user, as part of a registration process with an account and/or device, may utter a phrase multiple times and the resulting features (or an average of the features) can be stored with an association to an account of the user. In some implementations, text dependent and/or text independent speaker features can be generated. In some implementations, one or more other sensors, such as a camera, can be utilized to determine an identifier of a user. For example, visual data can be processed by user identification engine 125 to generate one or more visual features that can be utilized as an identifier of a user account.

At step 815, one or more actions are determined that are to be performed by the shared device. For example, for a request of "OK Assistant, play my morning playlist," action processing engine 180 can identify a series of songs that the user has previously indicated is a "morning playlist" and provide a music application that is executing on the shared device to initiate playing the songs of the playlist (and/or action processing engine 180 can provide fulfillment data to the music application, which can identify the "morning playlist"). Also, for example, for a request of "OK Assistant, start my morning routine," the action processing engine 180 can identify a series of actions to perform.

At step 820, performance of one or more of the actions is initiated. The actions can be initiated by the automated assistant and/or the automated assistant can provide one or more other applications with fulfillment data to perform one or more actions. For example, as previously described, a music application can be provided with a name of a playlist, and the music application can initiate performance of the playlist by starting the first song of the playlist, followed by additional songs of the playlist.

At step 825, one or more components executing on the shared device determines that the user is no longer co-present with the shared device. In some implementations, a component that shares one or more characteristics with user presence monitor 120 can determine that the user is no longer present based on sensor data from one or more components of the shared device. For example, user presence monitor 120 can determine that the user is not present based on audio data, visual data, wifi signals, BLUETOOTH signals, and/or other sensor data that indicates that the user is a threshold distance from the shared device. Also, for example, one or more other devices may identify that the user is within a threshold distance, and provide an indication to the shared device that the current location of the user is near a device in another room. For example, the shared device may be in a living room, and a device in the kitchen may identify that the user is proximate to it (i.e., in the kitchen) and provide an indication to the shared device that the user is no longer in the living room.

Figure 8B:
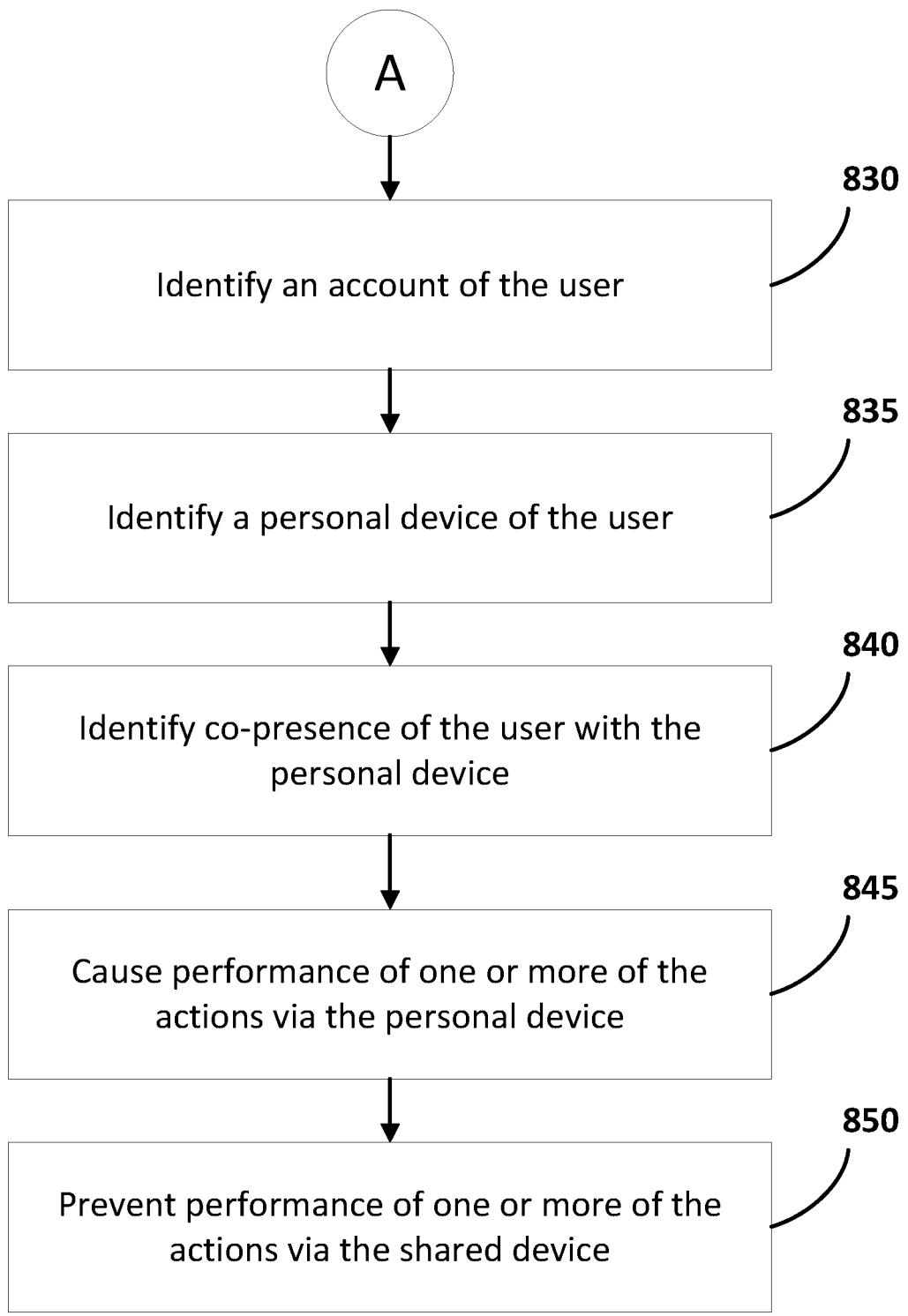

Referring to FIG. 8B, at step 830, an account of the user is identified based on the identifier. As previously described, the identifier may be one or more features that are determined from audio data captured by microphones of the shared device, visual data, and/or other sensor data. The account may be associated with features that were previously determined during an initialization and/or setup procedure when the account of the user was created and/or when a device was first associated with the account of the user.

At step 835, a personal device of the user that is associated with the account of the user is identified. The personal device of the user may be a device that is only accessible to the user and/or a device that, when rendering a response, is only available to the user. For example, a personal device may be a smartphone of the user that includes security measures such that only the user can access the device. Also, for example, a personal device may include headphones and/or other speakers that are only audible to the user. Thus, when a response is provided to the personal device, other users that may be co-present with the user will not be able to hear and/or see the response. In some implementations, a personal device may further include encryption abilities such that data that is provided to the device and/or provided by the user via the device is encrypted to improve security when transmitting sensitive information.

At step 840, co-presence of the user with another device is determined. In some implementations, co-presence with the other device can be identified based on sensor data from one or more sensors of the device. In some implementations, the other device is a personal device, such as a smartphone and/or headphones that is only accessible to the user.

At step 845, performance of one or more of the actions is transferred to the personal device. For example, if the action(s) being performed is playing a playlist of songs, performance of the currently playing song can be transferred to the personal device. In some implementations, the action may be started from the beginning of the action (e.g., starting over the currently playing song). In some implementations, the currently playing song can be started at the same point as where in the song the shared device is playing the song. For example, if co-presence with the personal device is identified when a song is at the 2 minute and 30 second point, the song can be continued on the personal device at the 2 minute and 30 second location in the audio.

In some implementations, causing performance of the one or more actions occurs only when the user is detected to be co-present with the personal device and not co-present with the shared device for at least a threshold period of time. For example, in instances where the user may be moving around a location (e.g., changing rooms in a short period of time, then returning), the user may not intend for the actions to be transferred to a personal device. However, in instances where the user has not been present with the shared device for a threshold period of time may be an indication that the user has left the location of the shared device and does not intend to return while the actions are being performed.

At step 850, performance of one or more actions that have yet to be performed is prevented from occurring via the shared device. In some implementations, the actions are prevented from occurring when fulfillment data to perform the actions are transferred to the personal device of the user. For example, if a playlist includes 10 songs and 2 songs have been played via the shared device when the user is no longer co-present with the shared device, the automated assistant of the shared device can prevent the remaining 8 songs from being played via the shared device. Instead, those 8 songs can be played via the personal device. Any action that is currently being performed can be transferred to the personal device, started over again via the personal device, and/or finished via the shared device before transferring other actions to the personal device.

Figure 9A:
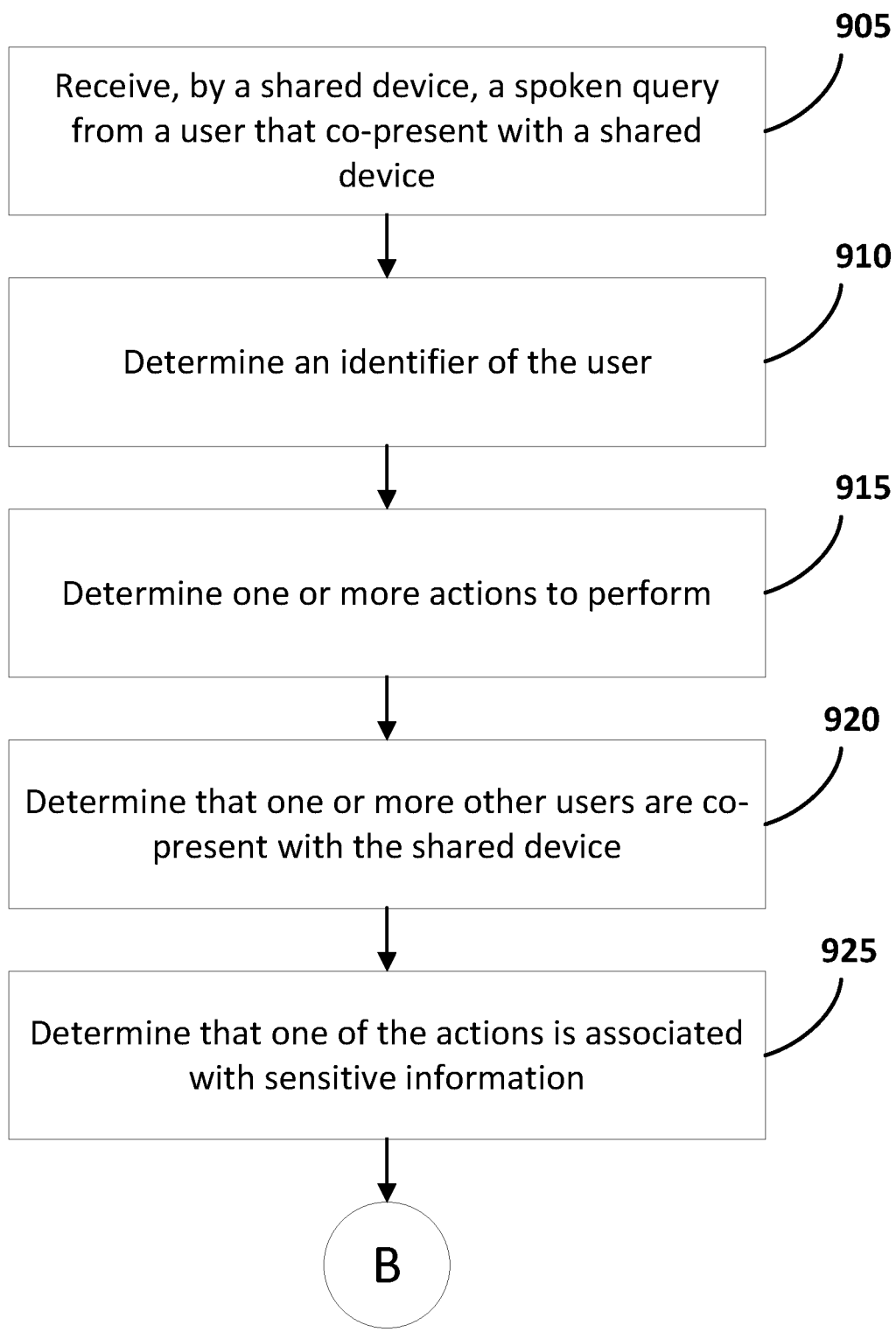
FIG. 9A and FIG. 9B is a flowchart illustrating another example method according to various implementations disclosed herein.
Figure 9B:
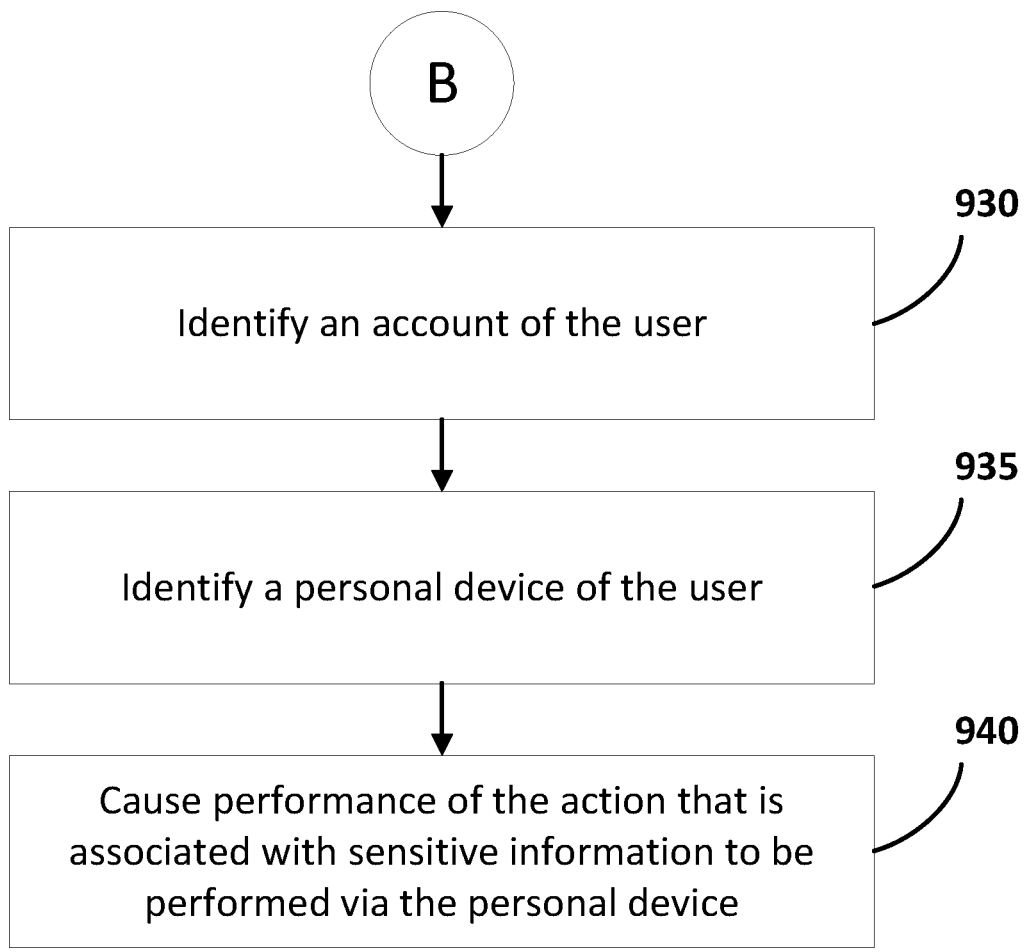

Referring to FIG. 9, a flowchart is provided that illustrates another method for transferring one or more actions from a shared device to a personal device of a user. In some implementations, one or more steps of the method can be omitted or combined, and/or one or more additional steps can be included in the method. The method can be performed by one or more components that are illustrated in the environment of FIG. 1.

At step 905, a spoken query is received from a user that is co-present with a shared device. Step 905 can share one or more characteristics with step 805 of FIG. 8A. For example, sensor data from one or more sensors of a shared device can include an utterance that includes a user invoking an automated assistant and further uttering a request and/or query.

At step 910, an identifier of the user can be determined. Step 910 can share one or more characteristics with step 810 of FIG. 8A. For example, one or more features can be determined based on the spoken utterance received at step 905. The features can be determined utilizing text dependent speaker identification and/or text independent speaker identification. For example, features may be determined for the utterance based on processing the invocation phrase "OK Assistant," and compared with other features that are known to be the user, such as features generated previously when the user created an account and/or set up a new device.

At step 915, one or more actions are determined that are to be performed by the automated assistant and/or by one or more other applications executing on the shared device and/or on a device that is in communication with the shared device. For example, the user may utter a spleen query of "OK Assistant, play a movie on my TV," and fulfillment data can be generated that may be provided to a television. In some implementations, step 915 can share one or more characteristics with step 815 of FIG. 8A.

At step 920, co-presence of one or more other users with the shared device can be determined based on sensor data of one or more sensors of the shared device. As previously described, co-presence can be determined based on sensor data from one or more sensors of the shared device. For example, audio data captured by one or more microphones of the shared device may indicate that more than one person is speaking. Also, for example, visual data from one or more cameras may indicate the presence of multiple users.

At step 925, the automated assistant can determine that an action that is to be performed is associated with sensitive information. In some implementations, the sensitive information can be included in a response from the automated assistant. For example, a response can include account information of the user, such as a phone number and/or a username that the user may not intend to be provided to other users. In some implementations, a request from the automated assistant may elicit sensitive information. For example, the user may provide a request of "OK Assistant, rent a movie and play it on my TV." In response, the automated assistant may require payment information and can provide a response asking for the payment information, such as "Please enter your credit card information."

At step 930, an account of the user is identified. Identifying an account of the user can share one or more characteristics step 830 of FIG. 8B. For example, an account of a user may be associated with features that were previously determined from audio data of the user uttering one or more phrases, as previously described. At step 935, a personal device of the user can be identified. Step 935 can share one or more characteristics with step 835 of FIG. 8B.

At step 940, performance of the action that is associated with sensitive information is provided via the personal device of the user that was identified in step 935. In some implementations, the sensitive information can be rendered via an interface of the personal device. For example, a request of "Please enter your payment information" may be rendered via a smartphone of the user and not via a speaker while another user is co-present with the speaker. In some implementations, one or more encryption techniques may be utilized to provide and/or receive the sensitive information. For example, a personal device may be configured to encrypt payment information before providing the payment information to a third party, whereas a smart speaker may not be configured to perform the same encryption.

In some implementations, before the action that is associated with sensitive information is performed via the personal device, the automated assistant executing on the shared device may request that the transfer take place. For example, before transferring a request for sensitive information to the personal device, the automated assistant may provide a request of "I will need payment information. Would you like to provide it using your smartphone?" If the user responds affirmatively, the transfer can take place and the user can continue using the smartphone. Thus, any sensitive information can be provided via the personal device and not provided via the shared device so that other users cannot hear the sensitive information.

Figure 10A:
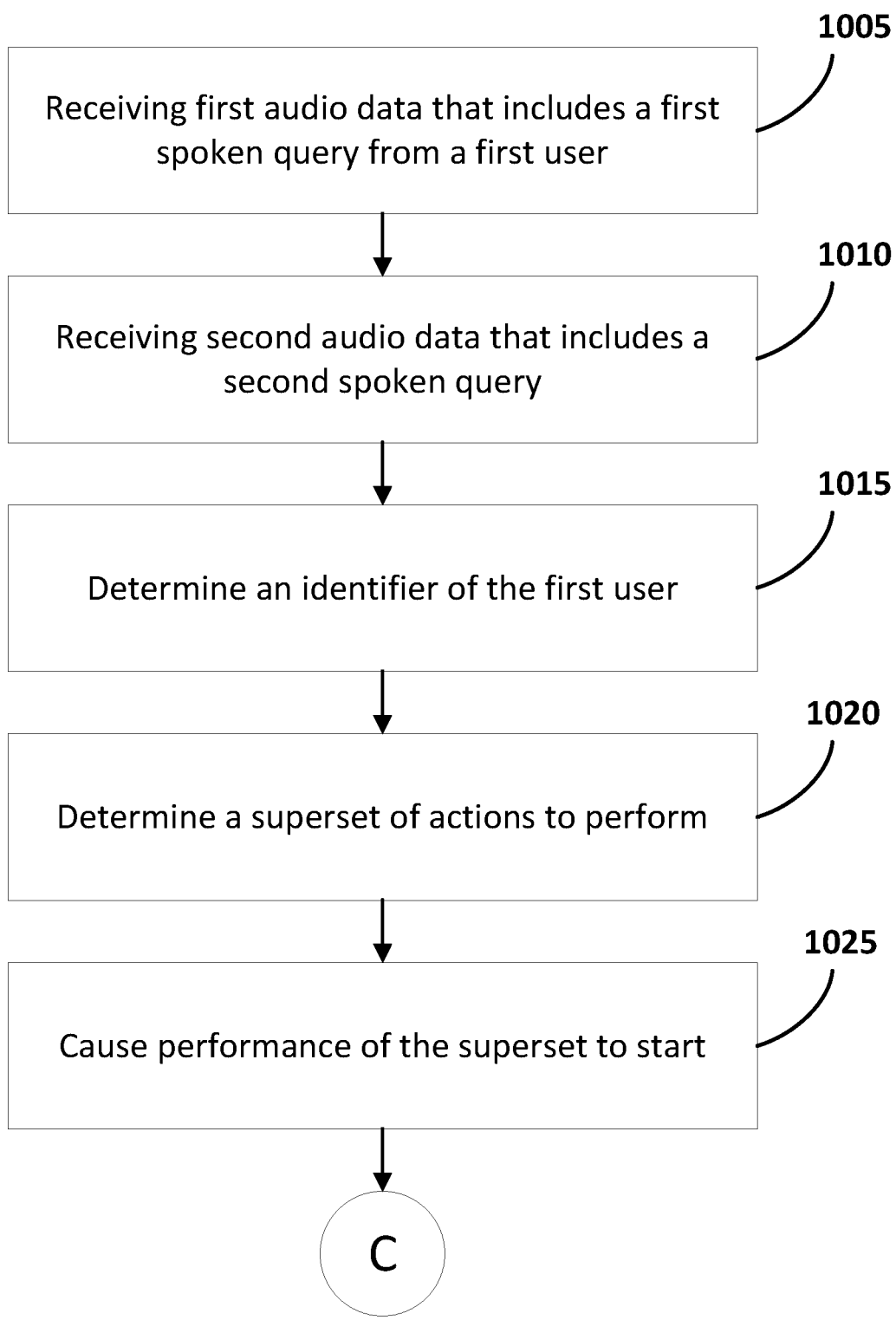
FIG. 10A and FIG. 10B is a flowchart illustrating another example method according to various implementations disclosed herein.
Figure 10B:
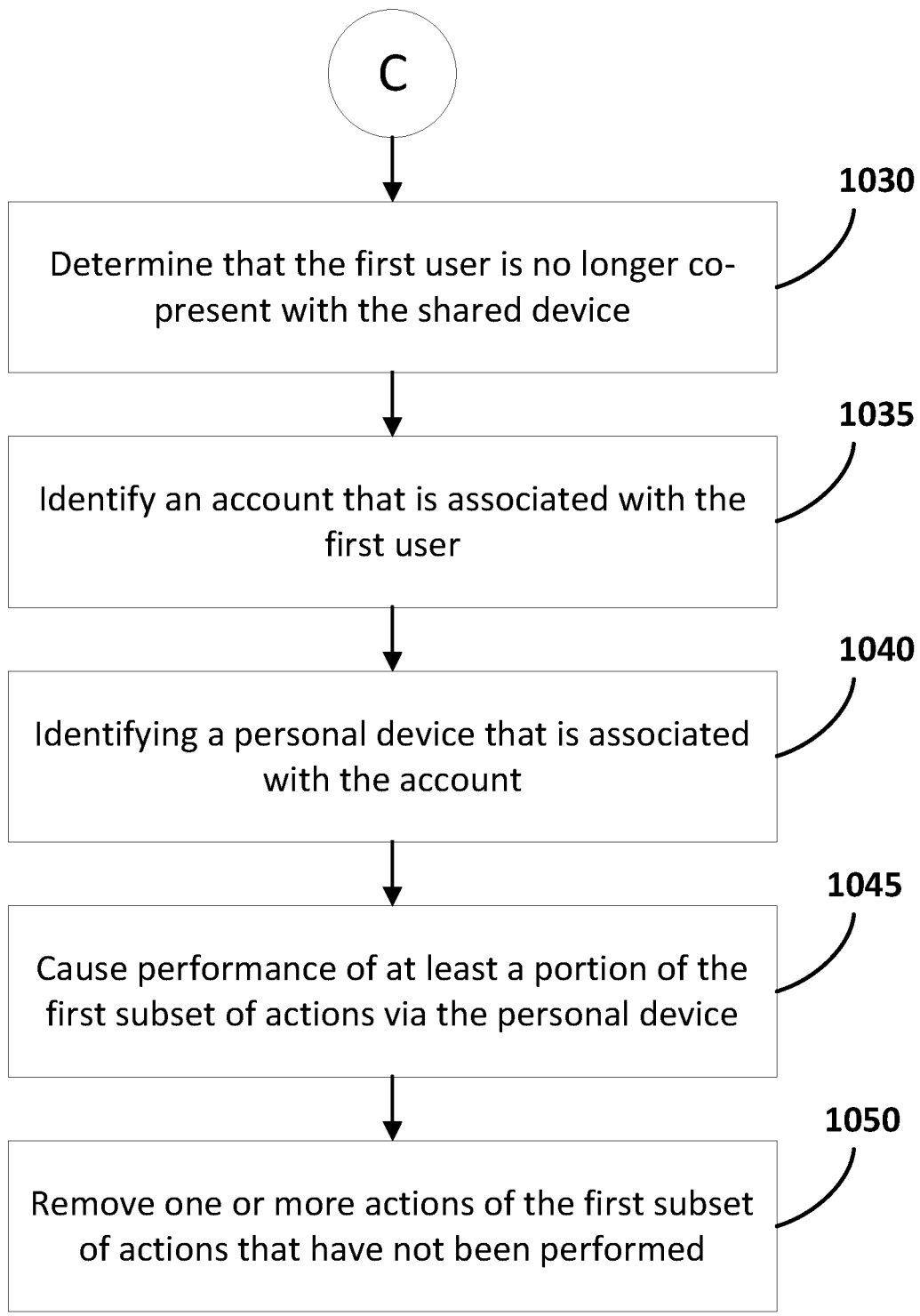

Referring to FIG. 10, a flowchart is provided that illustrates. In some implementations, one or more steps of the method can be omitted or combined, and/or one or more additional steps can be included in the method. The method can be performed by one or more components that are illustrated in the environment of FIG. 1.

At step 1005, first audio data is received that includes a first spoken query uttered by a first user. The first audio data can be captured via one or more microphones of a shared device, such as shared device 505 of FIGS. 5A and 5B. The spoken utterance may share one or more characteristics with utterance 515 of FIG. 5A. Step 1005 may share one or more characteristics with step 905 of FIG. 9A.

At step 1010, second audio data is received that includes a second spoken query uttered by a second user. The second audio data can be generated via one or more microphones of a device that shares one or more characteristics with shared device 505 of FIGS. 5A and 5B. The automated assistant can process audio data and determine, based on the audio data, that more than one person is present. For example, step 1010 can share one or more characteristics with step 920 of FIG. 9A. Thus, based on one or more features that may be generated based on an utterance of the first user can be compared to one or more features generated from the second utterance to determine that the second utterance did not originate from the same user as the first utterance.

At step 1015, an identifier of the first user is determined. Step 1015 can share one or more characteristics with step 810 of FIG. 8A. For example, one or more features can be determined based on the spoken utterance received at step 905. The features can be determined utilizing text dependent speaker identification and/or text independent speaker identification. For example, features may be determined for the utterance based on processing the invocation phrase "OK Assistant," and compared with other features that are known to be the user, such as features generated previously when the user created an account and/or set up a new device.

At step 1020, a superset of actions to perform is determined based on the first spoken query and the second spoken query. The superset can be comprised of the actions that are determined based on the first spoken query and the actions that are determined based on the second spoken query. For example, the first spoken query can be a request to play a playlist of the first user (e.g., spoken query 515) and the second spoken query can be to play a second playlist of the second user (e.g., spoken query 516). In response, a combined playlist 517 can be initiated that includes the songs from the first playlist and the songs from the second playlist. At step 1025, performance of the superset of actions is initiated.

Figure 5B:
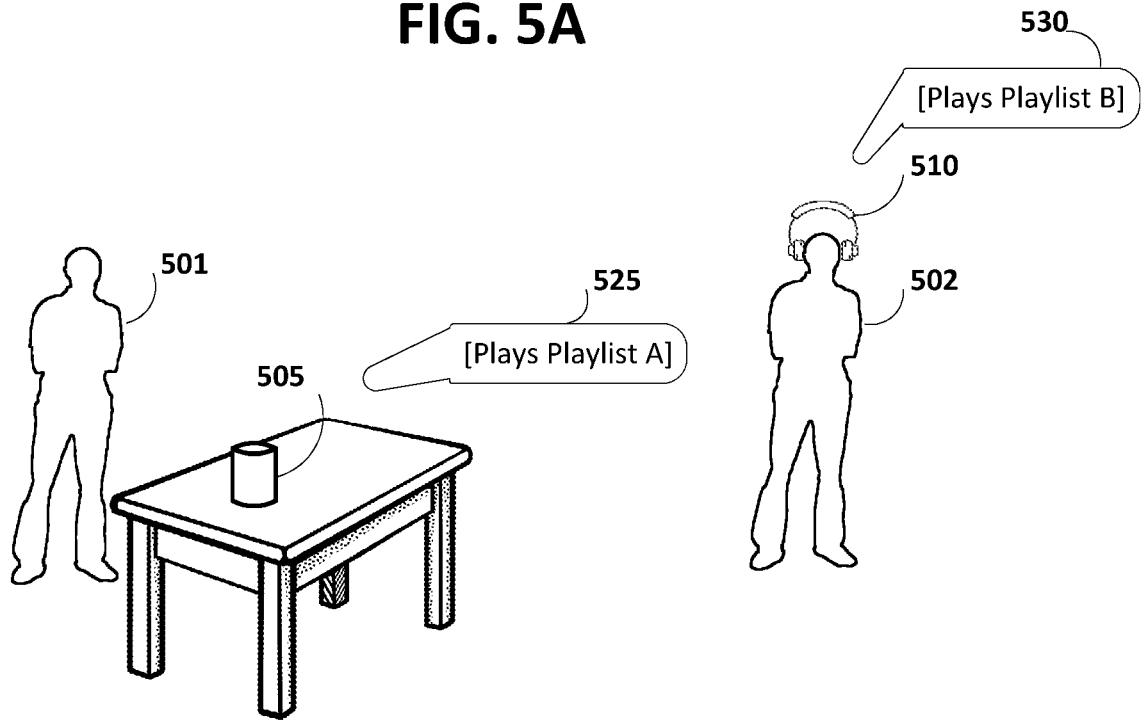

At step 1030, one or more components of the shared device determine that the first user is no longer co-present with the shared device. As illustrated in FIG. 5B, user 502 is no longer co-present with the shared device 505 (e.g., is a threshold distance from the shared device 505). Sensor data from one or more sensors of shared device 505 can be processed to determine that the user is no longer co-present with the device, as previously described herein. For example, shared device 505 can process audio data and/or visual data to determine that user 502 is no longer present near shared device 505.

At step 1035, an account that is associated with the first user is identified. Identifying an account of the user can share one or more characteristics step 830 of FIG. 8B. For example, an account of a user may be associated with features that were previously determined from audio data of the user uttering one or more phrases, as previously described. At step 935, a personal device of the user can be identified. Step 935 can share one or more characteristics with step 835 of FIG. 8B.

At step 1040, a personal device of the user that is associated with the account of the user is identified. The personal device of the user may be a device that is only accessible to the user and/or a device that, when rendering a response, is only available to the user. For example, a personal device may be a smartphone of the user that includes security measures such that only the user can access the device. Also, for example, a personal device may include headphones and/or other speakers that are only audible to the user. Thus, when a response is provided to the personal device, other users that may be co-present with the user will not be able to hear and/or see the response. In some implementations, a personal device may further include encryption abilities such that data that is provided to the device and/or provided by the user via the device is encrypted to improve security when transmitting sensitive information.

In some implementations, co-presence of the user with another device is determined. In some implementations, co-presence with the other device can be identified based on sensor data from one or more sensors of the device. In some implementations, the other device is a personal device, such as a smartphone and/or headphones that is only accessible to the user.

At step 1045, performance of one or more actions of the first subset of actions are initiated via the personal device. For example, if the action(s) being performed is playing a playlist of songs, performance of the currently playing song can be transferred to the personal device. In some implementations, the action may be started from the beginning of the action (e.g., starting over the currently playing song). In some implementations, the currently playing song can be started at the same point as where in the song the shared device is playing the song. For example, if co-presence with the personal device is identified when a song is at the 2 minute and 30 second point, the song can be continued on the personal device at the 2 minute and 30 second location in the audio.

At step 1050, one or more actions of the first subset of actions is removed from the superset of actions. For example, if the superset of actions includes Actions A, B, and C that were determined from the first spoken query, and Actions D, E, and F that were determined from the second spoken query, Actions A, B, and/or C (that have not yet been completed) can be removed from the superset of actions when the first user is no longer co-present with the shared device. In some implementations, if the second user subsequently is no longer co-present with the shared device, actions that were included in the superset of actions that were added based on the second spoken query may additionally be removed from the superset of actions. Thus, the shared device may only continue actions that were requested by users who are co-present with the shared device while other actions are transferred to personal devices of the users that respectively requested the actions.

Figure 11:
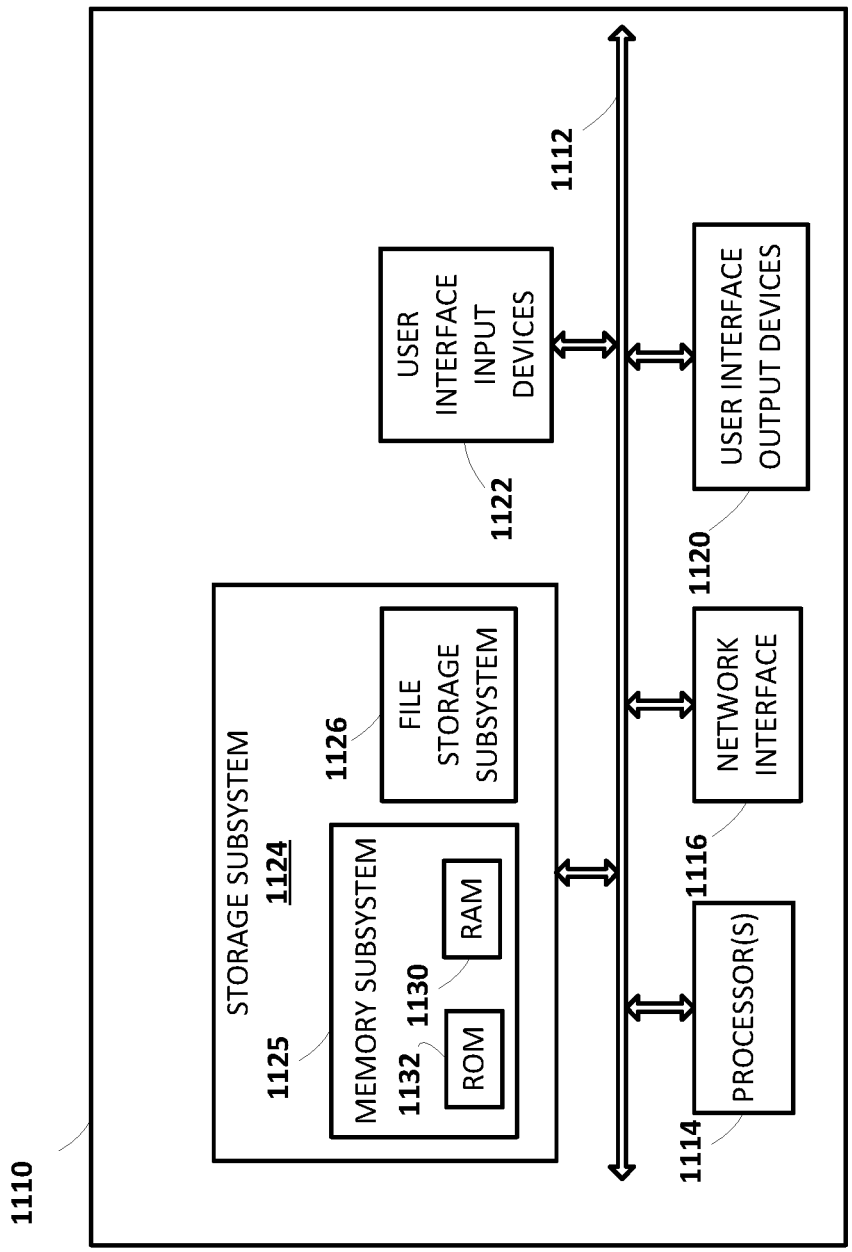
FIG. 11 illustrates an example architecture of a computing device.

FIG. 11 is a block diagram of an example computing device 1110 that may optionally be utilized to perform one or more aspects of techniques described herein. Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of the methods of FIG. 5 and FIG. 6, and/or to implement various components depicted in FIG. 2 and FIG. 3.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

Implementations disclosed herein include a method, comprising receiving, at a shared device, a spoken query from a user that is co-present with the shared device, wherein the spoken query is directed to an automated assistant that is executing, at least in part, on the shared device, determining, based on sensor data generated by one or more sensors of the shared device, an identifier of the user that is co-present with the shared device, determining one or more actions to perform in response to the spoken query, determining that one or more other users are co-present with the shared device, determining that one of the actions is associated with sensitive information of the user, identifying, based on the identifier of the user, an account that is associated with the user, and identifying a personal device that is associated with the account. In response to determining that one or more other users are co-present with the shared device and in response to determining that one of the actions is associated with sensitive information of the user, the method further comprises causing the one of the actions that is associated with sensitive information of the user to be rendered via the personal device and without any rendering of the one of the actions at the shared device.

These and other implementations of the technology disclosed herein can include one or more of the following features.

In some implementations, the method further includes providing a notification, via the shared device, that the one of the actions is associated with sensitive information, wherein causing the one of the actions to be rendered via the personal device is performed in response to receiving an affirmative response from the user, wherein the affirmative response is provided in response to providing the notification.

In some implementations, the method further includes determining that at least one feature of the personal device is more secure than a corresponding feature of the shared device. In some of those implementations, the at least one feature of the personal device includes one or more speakers that are audible only to the first user. In other of those implementations, the at least one feature includes a graphical interface, and the step of causing the one or more actions that are associated with sensitive information includes rendering the action via the interface without rendering the action audibly. In yet other of those implementations, the at least one feature includes encrypting the sensitive information.

In another aspect, a implementations of another method disclosed herein include receiving, by a shared device, first audio data that includes a first spoken query from a first user that is co-present with the shared device, wherein the first spoken query is directed to an automated assistant that is executing, at least in part, on the shared device, receiving, by the shared device, second audio data that includes a second spoken query from a second user that is co-present with the shared device, wherein the second spoken query is directed to the automated assistant, determining, based on sensor data generated by one or more sensors of the shared device, a first identifier of the first user, determining a superset of actions to perform in response to the first spoken query and the second spoken query, wherein the superset includes a first subset of actions that are associated with the first spoken query and a second subset of actions that are associated with the second spoken query, causing performance of the superset of actions to initiate via the shared device, determining, based on the sensor data from the one or more sensors, that the first user is no longer co-present with the shared device, identifying, based on the identifier of the user, an account that is associated with the first user, identifying a personal device that is associated with the account, causing performance of at least a portion of the first subset of actions via the personal device, and removing, from the superset of actions, one or more actions of the first subset of actions that have not been performed.

These and other implementations of the technology disclosed herein can include one or more of the following features.

In some implementations, the sensor data comprises audio data.

In some implementations, the method further includes determining, based on the sensor data from the one or more sensors, that the second user is no longer co-present with the shared device, and removing, from the superset of actions, one or more actions of the first subset of actions that have not been performed. In some of those implementations, the method further includes identifying, based on the identifier of the user, an account that is associated with the second user, identifying a personal device of the second user that is associated with the account of the second user, and causing performance of at least a portion of the first subset of actions via the personal device of the second user.

In some implementations, determining the identifier of the user includes processing a portion of the audio data, that includes the utterance, to determine one or more speaker features.

In yet another aspect, implementations disclosed herein include another method that includes the steps of receiving, at a shared device, an utterance that includes a spoken query from a user that is co-present with the shared device, wherein the spoken query is directed to an automated assistant that is executing, at least in part, on the shared device, determining, based on sensor data generated by one or more sensors of the shared device, an identifier of the user that is co-present with the shared device, determining one or more actions to perform in response to the spoken query, causing performance of the one or more actions via the shared device, determining, based on the sensor data from the one or more sensors, that the user is no longer co-present with the shared device, identifying, based on the identifier of the user, an account that is associated with the user, identifying a personal device that is associated with the account, and identifying, based on an indication from the personal device, that the user is co-present with the personal device. In response to identifying that the user is co-present with the personal device, the method further includes causing performance of one or more the actions via the personal device, and preventing performance of one or more of the actions via the shared device.

In some implementations, the sensor data comprises audio data. In some of those implementations, determining the identifier of the user includes processing a portion of the audio data, that includes the utterance, to determine one or more speaker features. In some of those instances, the one or more features are determined based on text dependent speaker identification. In other of those instances, the one or more features are determined based on text independent speaker identification. In other of those implementations, identifying the account associated with the user includes determining that the one or more features are within a threshold distance, in an embedding space, from an account embedding associated with the account, and identifying the account based on the association between the account embedding and the account.

In some implementations, in response to determining that the user is no longer co-present with the shared device, and in response to identifying the personal device of the user, the method further includes providing a notification to the user, via the shared device, wherein the notification requests that the one or more action be performed by the personal device, wherein causing performance of the action via the personal device is performed in response to an affirmative response from the user.

In some implementations, the request is for media playback via the shared device.

In some implementations, the personal device includes one or more speakers that are audible to the user and are inaudible to one or more other users.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A computer implemented method, comprising:
receiving, by a shared device, first audio data that includes a first spoken query from a first user that is co-present with the shared device, wherein the first spoken query is directed to an automated assistant that is executing, at least in part, on the shared device;
receiving, by the shared device, second audio data that includes a second spoken query from a second user that is co-present with the shared device, wherein the second spoken query is directed to the automated assistant;
determining, based on sensor data generated by one or more sensors of the shared device, a first identifier of the first user;
determining a superset of actions to perform in response to the first spoken query and the second spoken query, wherein the superset includes a first subset of actions that are associated with the first spoken query and a second subset of actions that are associated with the second spoken query;
causing performance of the superset of actions to initiate via the shared device;
determining, based on the sensor data from the one or more sensors, that the first user is no longer co-present with the shared device;
identifying, based on the first identifier of the first user, an account that is associated with the first user;
identifying a personal device that is associated with the account;
causing performance of at least a portion of the first subset of actions via the personal device; and
removing, from the superset of actions, one or more actions of the first subset of actions that have not been performed.

2. The method of claim 1, wherein the sensor data comprises audio data.

3. The method of claim 1, further comprising:
determining, based on the sensor data from the one or more sensors, that the second user is no longer co-present with the shared device; and
removing, from the superset of actions, one or more actions of the first subset of actions that have not been performed.

4. The method of claim 3, further comprising:
identifying, based on a second identifier of the second user, an account that is associated with the second user;
identifying a personal device of the second user that is associated with the account of the second user; and
causing performance of at least a portion of the first subset of actions via the personal device of the second user.

5. The method of claim 1, wherein determining the first identifier of the first user includes:
processing a portion of the first audio data, that includes an utterance, to determine one or more speaker features.

6. The method of claim 1, wherein the superset of actions to perform in response to the first spoken query and the second spoken query is a superset of song playing actions for a superset of songs.

7. The method of claim 1, wherein the first subset of actions comprises playing a first plurality of songs and the second subset of actions comprises playing a second plurality of songs, and wherein causing performance of at least a portion of the first subset of actions via the personal device includes playing at least one of the first plurality of songs via the personal device.

8. The method of claim 1, wherein determining that the first user is no longer co-present with the shared device is based on a detected distance between the first user and the shared device exceeding a threshold distance.

9. The method of claim 1, wherein causing performance of at least a portion of the first subset of actions via the personal device comprises initiating performance of a currently performing action from the superset of actions at a corresponding point in the action.

10. A shared device comprising:
one or more sensors;
memory storing instructions; and
one or more processors operable to execute the instructions to:
receive first audio data that includes a first spoken query from a first user that is co-present with the shared device, wherein the first spoken query is directed to an automated assistant that is executing, at least in part, on the shared device;
receive second audio data that includes a second spoken query from a second user that is co-present with the shared device, wherein the second spoken query is directed to the automated assistant;
determine, based on sensor data generated by one or more of the sensors, a first identifier of the first user;
determine a superset of actions to perform in response to the first spoken query and the second spoken query, wherein the superset includes a first subset of actions that are associated with the first spoken query and a second subset of actions that are associated with the second spoken query;
cause performance of the superset of actions to initiate via the shared device;
determine, based on the sensor data from the one or more sensors, that the first user is no longer co-present with the shared device;
identify, based on the first identifier of the first user, an account that is associated with the first user;
identify a personal device that is associated with the account;
cause performance of at least a portion of the first subset of actions via the personal device; and
remove, from the superset of actions, one or more actions of the first subset of actions that have not been performed.

11. The shared device of claim 10, wherein the sensor data comprises audio data.

12. The shared device of claim 10, wherein one or more of the processors are further operable to execute the instructions to:
determine, based on the sensor data from the one or more sensors, that the second user is no longer co-present with the shared device; and
remove, from the superset of actions, one or more actions of the first subset of actions that have not been performed.

13. The shared device of claim 10, wherein one or more of the processors are further operable to execute the instructions to:

identify, based on a second identifier of the second user, an account that is associated with the second user;
identify a personal device of the second user that is associated with the account of the second user; and
cause performance of at least a portion of the first subset of actions via the personal device of the second user.

14. The shared device of claim 10, wherein in determining the first identifier of the first user one or more of the processors are to:
process a portion of the first audio data, that includes an utterance, to determine one or more speaker features.

15. The shared device of claim 10, wherein the superset of actions to perform in response to the first spoken query and the second spoken query is a superset of song playing actions for a superset of songs.

16. The shared device of claim 10, wherein the first subset of actions comprises playing a first plurality of songs and the second subset of actions comprises playing a second plurality of songs, and wherein in causing performance of at least a portion of the first subset of actions via the personal device one or more of the processors are to cause playing at least one of the first plurality of songs via the personal device.

17. The shared device of claim 10, wherein in determining that the first user is no longer co-present with the shared device one or more of the processors are to determine that the first user is no longer co-present with the shared device based on a detected distance between the first user and the shared device exceeding a threshold distance.

18. The shared device of claim 10, wherein in causing performance of at least a portion of the first subset of actions via the personal device one or more of the processors are to initiate performance of a currently performing action from the superset of actions at a corresponding point in the action.

19. A non-transitory computer readable storage medium storing instructions configured for execution by at least one processor, the instructions comprising instructions to:
receive, by a shared device, first audio data that includes a first spoken query from a first user that is co-present with the shared device, wherein the first spoken query is directed to an automated assistant that is executing, at least in part, on the shared device;
receive, by the shared device, second audio data that includes a second spoken query from a second user that is co-present with the shared device, wherein the second spoken query is directed to the automated assistant;
determine, based on sensor data generated by one or more sensors of the shared device, a first identifier of the first user;
determine a superset of actions to perform in response to the first spoken query and the second spoken query, wherein the superset includes a first subset of actions that are associated with the first spoken query and a second subset of actions that are associated with the second spoken query;
cause performance of the superset of actions to initiate via the shared device;
determine, based on the sensor data from the one or more sensors, that the first user is no longer co-present with the shared device;
identify, based on the first identifier of the first user, an account that is associated with the first user;
identify a personal device that is associated with the account;
cause performance of at least a portion of the first subset of actions via the personal device; and
remove, from the superset of actions, one or more actions of the first subset of actions that have not been performed.

* * * * *